(12) United States Patent
Bierdel et al.

(10) Patent No.: US 10,836,076 B2
(45) Date of Patent: Nov. 17, 2020

(54) PROCESS FOR EXTRUDING PLASTIC COMPOSITIONS

(71) Applicant: Covestro Deutschland AG, Leverkusen (DE)

(72) Inventors: Michael Bierdel, Leverkusen (DE); Thomas Koenig, Leverkusen (DE); Carsten Conzen, Leverkusen (DE); Ulrich Liesenfelder, Bergisch-Gladbach (DE); Klemens Kohlgrueber, Kuerten (DE); Reiner Rudolf, Leverkusen (DE); Johann Rechner, Kempen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 169 days.

(21) Appl. No.: 16/170,729

(22) Filed: Oct. 25, 2018

(65) Prior Publication Data
US 2019/0061200 A1 Feb. 28, 2019

Related U.S. Application Data

(63) Continuation of application No. 13/000,052, filed as application No. PCT/EP2009/004248 on Jun. 12, 2009.

(30) Foreign Application Priority Data

Jun. 20, 2008 (DE) .................. 10 2008 029 303

(51) Int. Cl.
*B29B 7/00* (2006.01)
*B29B 7/48* (2006.01)
(Continued)

(52) U.S. Cl.
CPC .............. *B29B 7/489* (2013.01); *B29B 7/481* (2013.01); *B29B 7/483* (2013.01); *B29B 7/484* (2013.01);
(Continued)

(58) Field of Classification Search
CPC ......... B29B 7/489; B29B 7/481; B29B 7/483; B29B 7/484; B29C 48/65; B29C 48/2517;
(Continued)

(56) References Cited

U.S. PATENT DOCUMENTS 4,063,717 A 12/1977 Booy
4,824,256 A 4/1989 Haring et al.
(Continued)

FOREIGN PATENT DOCUMENTS

DE 862668 C 1/1953
EP 0160124 A2 11/1985
(Continued)

OTHER PUBLICATIONS

Vergenes et al., A Global Computer Software for Polymer Flows in Corotating Twin Screw Extruders, 38 Polym. Eng. Sci., 1781-1792 (1998). (Year: 1998).

(Continued)

*Primary Examiner* — Anshu Bhatia
(74) *Attorney, Agent, or Firm* — K&L Gates LLP

(57) ABSTRACT

A process for extruding plastic compositions is provided. The process comprises providing a multi-screw extruder with screw elements and conveying, kneading, mixing, degassing or compounding the plastic compositions in the multi-screw extruder using the screw elements.

22 Claims, 19 Drawing Sheets

(51) Int. Cl.
 B29C 48/57 (2019.01)
 B29C 48/65 (2019.01)
 B29C 48/395 (2019.01)
 B29C 48/40 (2019.01)
 B29C 48/505 (2019.01)
 B29C 48/25 (2019.01)
 B29C 48/27 (2019.01)
 B29C 48/03 (2019.01)

(52) U.S. Cl.
 CPC ...... B29C 48/2517 (2019.02); B29C 48/2715 (2019.02); B29C 48/395 (2019.02); B29C 48/402 (2019.02); B29C 48/507 (2019.02); B29C 48/57 (2019.02); B29C 48/65 (2019.02); B29C 48/03 (2019.02)

(58) Field of Classification Search
 CPC ... B29C 48/2715; B29C 48/402; B29C 48/57; B29C 48/395; B29C 48/507; B29C 48/03
 See application file for complete search history.

(56) References Cited

U.S. PATENT DOCUMENTS

| | | | |
|---|---|---|---|
| 5,487,602 A * | 1/1996 | Valsamis | B29C 48/2564 366/81 |
| 5,851,065 A | 12/1998 | Ikeda et al. | |
| 6,170,975 B1 * | 1/2001 | Andersen | B01F 7/105 366/82 |
| 6,783,270 B1 * | 8/2004 | Padmanabhan | B29C 48/395 366/82 |
| 7,129,315 B2 | 10/2006 | Kirchhoff et al. | |
| 2002/0028340 A1 | 3/2002 | Fujii et al. | |
| 2004/0209977 A1 | 10/2004 | Hossan | |
| 2005/0121817 A1 | 6/2005 | Konig et al. | |
| 2007/0211560 A1 | 9/2007 | Takamoto et al. | |

FOREIGN PATENT DOCUMENTS

| | | |
|---|---|---|
| EP | 0771629 A1 | 5/1997 |
| EP | 0778078 A1 | 6/1997 |
| EP | 0931640 A1 | 7/1999 |
| EP | 1740638 A1 | 1/2007 |
| EP | 1832407 A1 | 9/2007 |
| WO | WO-95/33608 A1 | 12/1995 |
| WO | WO-2005/103114 A1 | 11/2005 |

OTHER PUBLICATIONS

Herbert Busemann, The Geometry of Geodesics, Academic Press, 31-32 (1955).

Joseph A. King, Jr., Synthesis of Polycarbonates, in Handbook of Polycarbonate Science and Technology, 9-10 (LeGrand and Bendier ed., 1999).

Yeh Wang, Compounding in Co-Rotating Twin-Screw Extruders, 10 Rapra Review Report, 7, iSmithers Rapra Publishing, (2000).

Bendler, John T., Handbook of Polycarbonate Science and Technology, CRC Press, 1999 (Book—not attached).

* cited by examiner

1) $R = 0.0625$   $M_x = 0.5208$
   $\alpha = 0.1745$   $M_y = 0.0000$

2) $R = 0.9375$   $M_x = -0.3409$
   $\alpha = 0.2803$   $M_y = -0.1519$

3) $R = 0.0625$   $M_x = 0.4452$
   $\alpha = 0.5822$   $M_y = 0.2325$

4) $R = 0.9375$   $M_x = 0.0000$
   $\alpha = 0.5337$   $M_y = -0.5208$

5) $R = 0.9375$   $M_x = 0.0000$
   $\alpha = 0.1745$   $M_y = -0.5208$

6) $R = 0.0625$   $M_x = -0.1519$
   $\alpha = 0.2803$   $M_y = 0.3409$

7) $R = 0.9375$   $M_x = 0.2325$
   $\alpha = 0.5822$   $M_y = -0.4452$

8) $R = 0.0625$   $M_x = -0.5208$
   $\alpha = 0.5337$   $M_y = -0.0000$

9) $R = 0.0625$   $M_x = -0.5208$
   $\alpha = 0.1745$   $M_y = -0.0000$

10) $R = 0.9375$   $M_x = 0.3409$
    $\alpha = 0.2803$   $M_y = 0.1519$

11) $R = 0.0625$   $M_x = -0.4452$
    $\alpha = 0.5822$   $M_y = -0.2325$

12) $R = 0.9375$   $M_x = -0.0000$
    $\alpha = 0.5337$   $M_y = 0.5208$

13) $R = 0.9375$   $M_x = -0.0000$
    $\alpha = 0.1745$   $M_y = 0.5208$

14) $R = 0.0625$   $M_x = 0.1519$
    $\alpha = 0.2803$   $M_y = -0.3409$

15) $R = 0.9375$   $M_x = -0.2325$
    $\alpha = 0.5822$   $M_y = 0.4451$

16) $R = 0.0625$   $M_x = 0.5208$
    $\alpha = 0.5337$   $M_y = -0.0000$

1') $R = 0.9375$   $M_x = 1.5208$
    $\alpha = 0.1745$   $M_y = -0.0000$

2') $R = 0.0625$   $M_x = 0.6591$
    $\alpha = 0.2803$   $M_y = -0.1519$

3') $R = 0.9375$   $M_x = 1.4452$
    $\alpha = 0.5822$   $M_y = 0.2325$

4') $R = 0.0625$   $M_x = 1.0000$
    $\alpha = 0.5337$   $M_y = -0.5208$

5') $R = 0.0625$   $M_x = 1.0000$
    $\alpha = 0.1745$   $M_y = -0.5208$

6') $R = 0.9375$   $M_x = 0.8481$
    $\alpha = 0.2803$   $M_y = 0.3409$

7') $R = 0.0625$   $M_x = 1.2325$
    $\alpha = 0.5822$   $M_y = -0.4452$

8') $R = 0.9375$   $M_x = 0.4792$
    $\alpha = 0.5337$   $M_y = -0.0000$

9') $R = 0.9375$   $M_x = 0.4792$
    $\alpha = 0.1745$   $M_y = -0.0000$

10') $R = 0.0625$   $M_x = 1.3409$
     $\alpha = 0.2803$   $M_y = 0.1519$

11') $R = 0.9375$   $M_x = 0.5548$
     $\alpha = 0.5822$   $M_y = -0.2325$

12') $R = 0.0625$   $M_x = 1.0000$
     $\alpha = 0.5337$   $M_y = 0.5208$

13') $R = 0.0625$   $M_x = 1.0000$
     $\alpha = 0.1745$   $M_y = 0.5208$

14') $R = 0.9375$   $M_x = 1.1519$
     $\alpha = 0.2803$   $M_y = -0.3409$

15') $R = 0.0625$   $M_x = 0.7675$
     $\alpha = 0.5822$   $M_y = 0.4451$

16') $R = 0.9375$   $M_x = 1.5208$
     $\alpha = 0.5337$   $M_y = -0.0000$

Fig. 13b

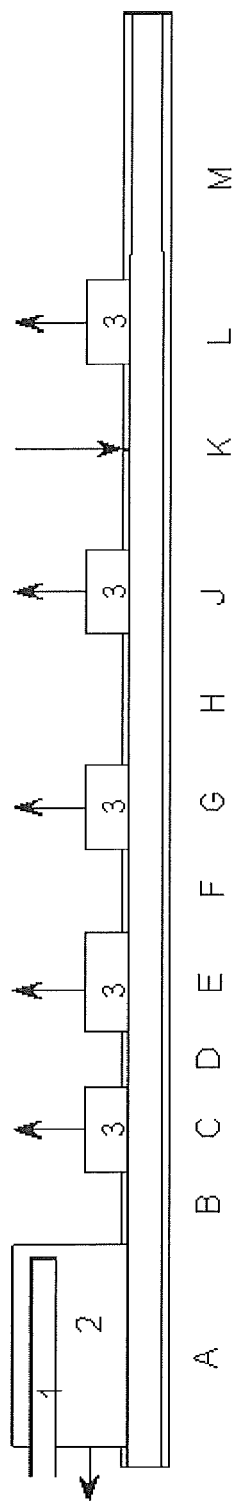
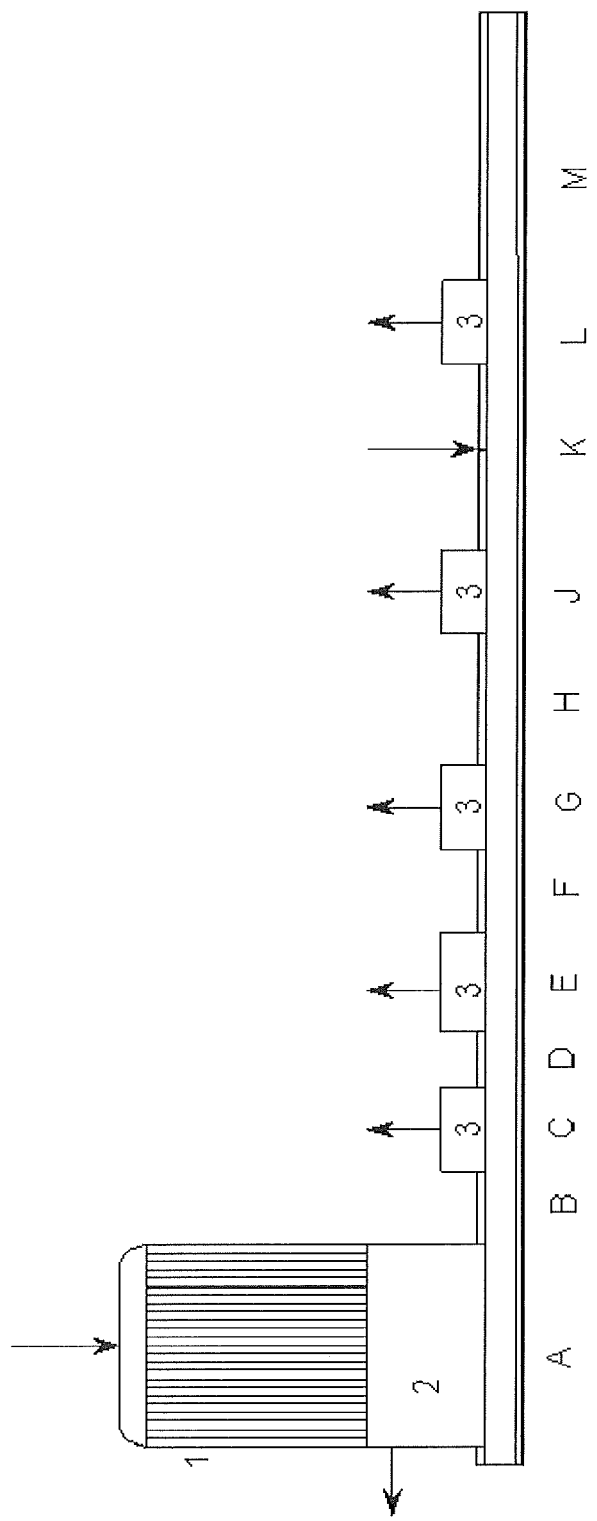
Fig. 14
Fig. 15

| | | |
|---|---|---|
| 1) | R = 0.6069 | Mx = 0.0000 |
| | α = 0.1829 | My = 0.0000 |
| 2) | R = 0.0000 | Mx = 0.5968 |
| | α = 0.6025 | My = 0.1104 |
| 2') | R = 1.0000 | Mx = −0.1104 |
| | α = 0.6025 | My = −0.5968 |
| 1') | R = 0.3931 | Mx = 0.0000 |
| | α = 0.1829 | My = 0.0000 |

1) R = 0.2420  Mx = 0.3649
   α = 0.7854  My = 0.0000
1') R = 0.7580  Mx = 0.0000
    α = 0.7854  My = -0.3649

RA = 0.6069

PROCESS FOR EXTRUDING PLASTIC COMPOSITIONS

CROSS-REFERENCE TO RELATED APPLICATIONS

This application is a continuation of U.S. national stage application Ser. No. 13/000,052, filed under 35 U.S.C. § 371 on Apr. 15, 2011, which claims priority to International Application No. PCT/EP2009/004248, which was filed on Jun. 12, 2009, and which claims priority to German Patent Application No. 10 2008 029 303.2, which was filed on Jun. 20, 2008. The contents of each are incorporated by reference into this specification.

FIELD

The invention relates to a process for extruding plastic compositions, in particular polymer melts and mixtures of polymer melts, above all thermoplastics and elastomers, particularly preferably polycarbonate and polycarbonate blends, also with the incorporation of other substances such as for example solids, liquids, gases or other polymers or other polymer blends with improved optical characteristics, with the assistance of a multi-screw extruder with specific screw geometries.

BACKGROUND

Extrusion is a known process in the production, compounding and processing of polymers. Extrusion is here and hereinafter taken to mean the treatment of a substance or substance mixture in a co-rotating twin- or multi-screw extruder, as is comprehensively described in [1] ([1]=Kohlgrüber. Der gleichläufige Doppelschneckenextruder [The co-rotating twin-screw extruder], Hanser Verlag Munich 2007).

A multi-screw extruder is hereinafter always also taken to mean a ring extruder.

The treatment of plastic compositions during extrusion includes one or more of the operations: conveying, melting, dispersion, mixing, expulsion of liquid constituents, degassing and pressure build-up.

In polymer production, extrusion serves, for example, to remove volatile constituents such as monomers and residual solvents from the polymer ([1], pages 192 to 212), to carry out polyaddition and polycondensation reactions and optionally to melt and convert polymers and optionally to mix additives with the polymer.

During polymer compounding, extrusion is above all used to produce mixtures of polymers with additives and auxiliaries and reinforcing materials and colors and to produce mixtures of different polymers which differ, for example, in chemical composition, molecular weight or molecular structure (see for example [1], pages 59 to 93). Compounding involves the conversion of a polymer into a finished plastics molding composition (or compound) using plastics raw materials, which are conventionally melted, and adding and incorporating and mixing fillers and/or reinforcing materials, plasticizers, bonding agents, slip agents, stabilizers, colors etc. with the polymer. Compounding often also includes the removal of volatile constituents such as for example air and water. Compounding may also involve a chemical reaction such as for example grafting, modification of functional groups or molecular weight modifications by deliberately increasing or decreasing molecular weight.

As is generally known and described, for example, in [1] on pages 169 to 190, mixing may be differentiated into distributive and dispersive mixing. Distributive mixing is taken to mean the uniform distribution of various components in a given volume. Distributive mixing occurs, for example, when similar polymers are mixed. In dispersive mixing, solid particles, fluid droplets or gas bubbles are firstly subdivided. Subdivision entails applying sufficiently large shear forces in order, for example, to overcome the surface tension at the interface between the polymer melt and an additive. Mixing is always understood below to mean distributive and/or dispersive mixing.

Melt conveying and pressure build-up are described on pages 73 et seq. of publication [1]. The melt conveying zones serve to transport the product from one processing zone to the next and to draw in fillers. Melt conveying zones are generally partially filled, such as for example during the transport of the product from one processing zone to the next, during degassing and in holding zones.

During polymer processing, the polymers are preferably converted into the form of a semi-finished product, a ready-to-use product or a component. Processing may [proceed], for example, by injection molding, extrusion, film blowing, calendering or spinning Processing may also involve mixing polymers with fillers and auxiliary substances and additives as well as chemical modifications such as for example vulcanization.

As a person skilled in the art is aware, polymer extrusion is advantageously performed on extruders with two or optionally more screws.

Co-rotating twin- or optionally multi-screw extruders, the rotors of which are fully self-wiping, have long been known (DE 862 668). Extruders which are based on the principle of fully self-wiping profiles have been put to many different uses in polymer production, compounding and processing. Such extruders are known to have a good mixing action, a good degassing action and a good action for melting polymers. They offer advantages in the quality of the products produced therewith because polymer melts adhere to surfaces and degrade over time at conventional processing temperatures, which is prevented by the self-cleaning action of fully self-wiping screws. Rules for producing fully self-wiping screw profiles were stated, for example, in Klemens Kohlgrüber: Der gleichläufige Doppelschneckenextruder [The co-rotating twin-screw extruder], Hanser Verlag Munich 2007, p. 96 et seq. [1]. The design of single-, double- and triple-flighted profiles is described therein. It is furthermore described how a predetermined screw profile of the 1st screw of a twin-screw extruder determines the screw profile of the 2nd screw of a twin-screw extruder. The screw profile of the 1st screw of the twin-screw extruder is therefore known as the generating screw profile. The screw profile of the 2nd screw of the twin-screw extruder follows from the screw profile of the 1st screw of the twin-screw extruder and is therefore known as the generated screw profile. In the case of a multi-screw extruder, neighboring screws are always arranged alternately with a generating screw profile and a generated screw profile.

It is known to a person skilled in the art that in the region of the screw tips a particularly large amount of energy is dissipated in the melt, which leads locally to severe overheating in the product. This is explained, for example, in [1] on pages 160 et seq. This local overheating may result in harm to the product such as for example a change in odor, color, chemical composition or molecular weight or in the formation of non-uniformities in the product such as gel particles or specks. A large tip angle, in particular, is harmful in this respect.

A person skilled in the art is aware that the rate of reaction at which polymer damage occurs is dependent on temperature. As a person skilled in the art knows and as may be verified, for example, in J. Robertson: Thermal Degradation Studies of Polycarbonate, Virginia Polytechnic Institute and State University, Blacksburg, 2001 in chapter 3 or in K. Chrissafis: Kinetics of Thermal Degradation of Polymers, Journal of Thermal Analysis and Calorimetry, vol. 95 (2009) 1, 273-283, the reaction rate constant k(T) can be described with the Arrhenius approach: $k(T)=A*\exp(-E_A/(R*T))$. In this equation, k means the reaction rate constant, T the absolute temperature in [K], A the frequency factor, $E_A$ the activation energy in [J/mol] and R the universal gas constant in [J/mol/K]. It is furthermore known that an increase in temperature of just 10K may result in a doubling of the reaction rate constant. Processes for extruding plastic compositions should therefore be designed such that the average temperature rise during processing and working of the plastic composition is as low as possible. In particular, the processes for extruding plastic compositions should be designed such that, during processing and working of the plastic composition, local temperature peaks, as occur for example in the tip zones of a screw element with an Erdmenger screw profile according to the prior art, are avoided.

Modern twin-screw extruders have a building-block system, in which various screw elements may be mounted on a core shaft. In this way, a person skilled in the art may adapt the twin-screw extruder to the particular task in hand. As a rule, screw elements with double- and triple-flighted profiles are used today, since single-flighted screw profiles have an excessively high energy input due to their large tip angle.

With the exception of eccentrically arranged circular disks, screw elements known from the prior art are characterized in that the profile curve comprises in its cross-section at least one kink (see for example FIG. 1), which occurs at the transition between the screw tip and the thread flanks. The tip consists of a circular arc with a radius=external diameter of the profile and the point of rotation of the profile as the center point. The kink at the transition to the profile flank forms an edge on the screw element.

One of the essential tasks carried out on multi-screw extruders is the dispersion of liquid phases or melts which are not homogeneously miscible in one another or the dispersion of solids in polymer melts. It is known from the technical literature (see for example Chang Dae Han: Multiphase Flow in Polymer Processing, Academic Press, New York 1981) that a combination of shear flow and stretching flow is ideal for difficult dispersion tasks.

Such flow prevails in a screw channel where the composition is, on the one hand, sheared by the rotation of the screws and, on the other hand, simultaneously stretched by the convergence of the screw channel towards the tip. In the zone of the screw tip, however, pure shear flow prevails which, in difficult dispersion tasks, will make hardly any contribution to dispersion. On the other hand, the greatest part of the input energy is dissipated in the gap between the screw tip and the barrel or the neighboring screw. This zone therefore makes a major contribution to heating the polymer composition and thus potentially to thermal damage, without contributing to the dispersion task in hand.

Eccentrically arranged circular disks which, as is known, may be arranged in fully self-wiping manner, are an exception. They do not comprise a tip zone with pure shear flow. They are known for their excellent dispersion action, but do have an elevated energy input because they produce a very narrow gap over a large circumferential zone. Their number of flights is moreover limited to Z=1.

SUMMARY

The object therefore arose of providing a process for extruding plastic compositions, in which the average and maximum increase in temperature is reduced in order to avoid polymer damage.

The object is surprisingly achieved in that a closely intermeshing, co-rotating compounding or degassing extruder is used, wherein screw elements which have particular geometries are used. These comprise screw elements, whose profile over the entire cross-section may be represented by a constantly differentiable profile curve. By using these screw elements for multi-screw extruders, it is possible to achieve the lowest possible energy input relative to the prior art, which results in a smaller increase in temperature and thus a lower average and maximum temperature. At the same time, a very good pressure build-up is achieved which is comparable with or even higher than the prior art.

It is surprisingly found that the pressure build-up capacity of the conveying element used according to the invention is greater than that of a conveying element with an Erdmenger screw profile according to the prior art. By means of a conveying element used according to the invention, it is therefore possible to bring about a desired or necessary pressure build-up for example in a shorter pressure build-up zone, whereby the extruder structure is either shortened or, at a constant extruder length, other processing zones, such as for example a degassing zone or a mixing zone, are lengthened, so enhancing their action on the plastic composition.

The present invention accordingly provides a process for compounding plastic compositions, in particular polymer melts and mixtures of polymer melts, above all thermoplastics and elastomers, particularly preferably polycarbonate and polycarbonate blends, also with incorporation of other substances such as for example solids, liquids, gases or other polymers or other polymer blends using co-rotating, closely intermeshing compounding or degassing extruders using screw elements for multi-screw extruders with screws co-rotating in pairs and being fully self-wiping in pairs with two or more screw flights, characterized in that the generating and the generated screw profile may in each case be represented over the entire cross-section by a constantly differentiable profile curve.

BRIEF DESCRIPTION OF THE DRAWINGS

The features and advantages of the examples, and the manner of attaining them, will become more apparent, and the examples will be better understood by reference to the following description taken in conjunction with the accompanying drawings, wherein:

FIG. 13b illustrates a non-limiting example of coordinates describing features illustrated in FIG. 13a;

FIG. 14 illustrates a non-limiting example of screw elements in a degassing extruder according to the present disclosure;

FIG. 15 illustrates a non-limiting example of screw elements in a degassing extruder according to the present disclosure;

FIG. 17b illustrates a pair of screw elements, configured as conveying elements, whose screw profile is based on FIG. 17a;

DETAILED DESCRIPTION

Figure 1:
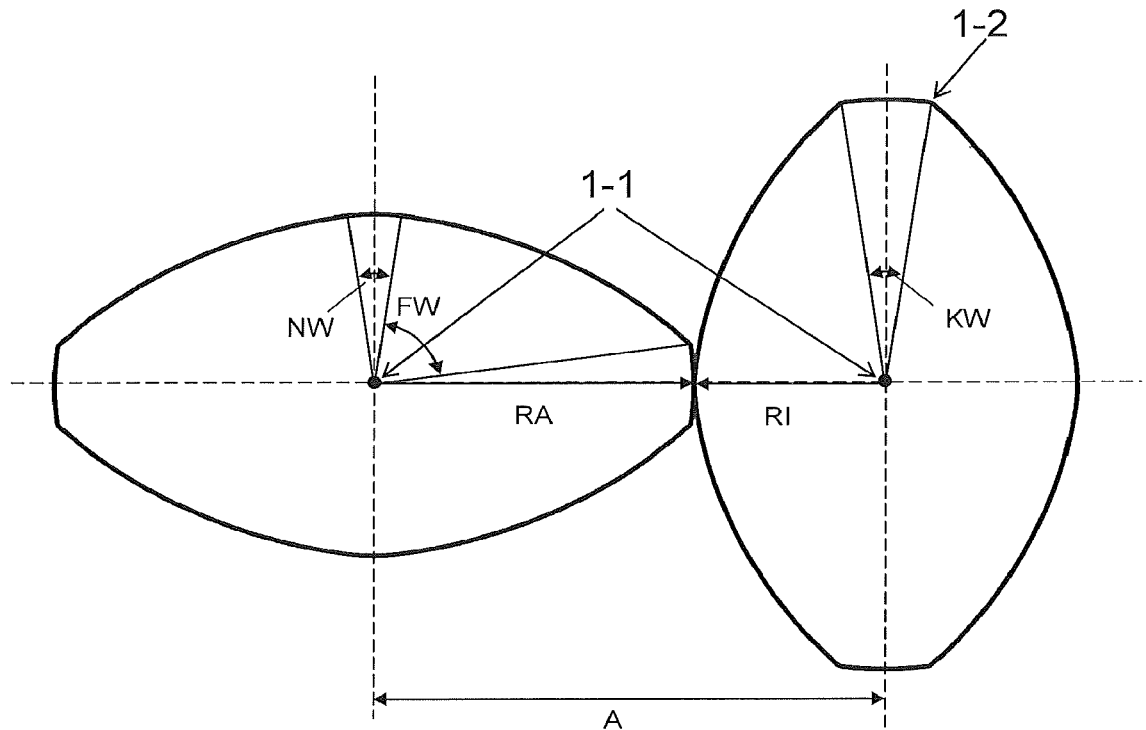
FIG. 1 is a screw element cross-section known from the prior art.

The invention is not here limited to screw elements of the currently conventional modular construction consisting of a screw with individual screw elements and core shafts, but also to screws of solid construction. The term "screw elements" should thus also be taken to mean screws of solid construction.

The cross-sectional profiles, hereinafter also known for short as profiles or also screw profiles, of screw elements used according to the invention may be unambiguously described by an arrangement of circular arcs.

The screw profile of generating and generated screw elements used according to the invention is composed in its entirety of n circular arcs, wherein n is greater than or equal to four. Each of the n circular arcs has a starting and an end point. The n circular arcs merge tangentially into one another at their start and end points, such that, according to the invention, they form a constantly differentiable profile curve.

The position of each circular arc j (j=1 to n) may be unambiguously established by stating two different points. The position of a circular arc is conveniently established by stating the center point and the starting or end point. The magnitude of an individual circular arc j is established by the radius $r_j$ and the angle $\alpha_j$ about the center point between the starting and end point, wherein the radius $r_j$ is greater than 0 and less than the centerline distance a between the screws and the angle $\alpha_j$ in radians is greater than or equal to 0 and less than or equal to $2\pi$, wherein $\pi$ is the circle constant.

Screw elements used according to the invention are characterized in that the generating screw profile and the generated screw profile lie in one plane, the axis of rotation of the generating screw profile and the axis of rotation of the generated screw profile at a distance a (centerline distance) are in each case perpendicular to said plane of the screw profiles, the point of intersection of the axis of rotation of the generating screw profile with said plane being designated as the point of rotation of the generating screw profile and the point of intersection of the axis of rotation of the generated screw profile with said plane being designated as the point of rotation of the generated screw profile, the number of circular arcs of the entire generating screw profile n is greater than or equal to four (n≥4), the outer radius ra of the generating screw profile is greater than zero (ra>0) and less than the centerline distance (ra<a), the core radius ri of the generating screw profile is greater than zero (ri>0) and less than or equal to ra (ri≤ra), all the circular arcs of the generating screw profile merge tangentially into one another, the circular arcs form a closed screw profile, i.e. the sum of the angles $\alpha_j$ of all the circular arcs j is equal to $2\pi$, wherein 7E is the circle constant ($\pi$≈3.14159), the circular arcs form a convex screw profile, each of the circular arcs of the generating screw profile lies within or at the limits of a circular ring with the outer radius ra and the core radius ri, the center point of which lies on the point of rotation of the generating screw profile, at least one of the circular arcs of the generating screw profile touches the outer radius ra of the generating screw profile at a point $P_A$, at least one of the circular arcs of the generating screw profile touches the core radius ri of the generating screw profile at a point $P_I$, the number of circular arcs n' of the generated screw profile is equal to the number of circular arcs n of the generating screw profile, the outer radius ra' of the generated screw profile is equal to the difference between the centerline distance and core radius ri of the generating screw profile (ra'=a−ri), the core radius ri' of the generated screw profile is equal to the difference between the centerline distance and outer radius ra of the generating screw profile (ri'=a−ra), the angle $α_j'$ of the j'th circular arc of the generated screw profile is equal to the angle $α_j$ of the jth circular arc of the generating screw profile, j and j' being integers which pass jointly through all the values in the range from 1 to the number of circular arcs n or n' respectively, the sum of radius $r_j'$ of the j'th circular arc of the generated screw profile and radius $r_j$ of the jth circular arc of the generating screw profile is equal to the centerline distance a, j and j' being integers which pass jointly through all the values in the range from 1 to the number of circular arcs n or n' respectively, the center point of the j'th circular arc of the generated screw profile is at a distance from the center point of the jth circular arc of the generating screw profile which is equal to the centerline distance a, and the center point of the j'th circular arc of the generated screw profile is at a distance from the point of rotation of the generated screw profile which is equal to the distance of the center point of the jth circular arc of the generating screw profile from the point of rotation of the generating screw profile, and the connecting line between the center point of the j'th circular arc of the generated screw profile and the center point of the jth circular arc of the generating screw profile is a line parallel to a connecting line between the point of rotation of the generated screw profile and the point of rotation of the generating screw profile, j and j' being integers which pass jointly through all the values in the range from 1 to the number of circular arcs n or n' respectively, a starting point of the j'th circular arc of the generated screw profile lies in a direction relative to the center point of the j'th circular arc of the generated screw profile which is opposite to that direction which a starting point of the jth circular arc of the generating screw profile has relative to the center point of the jth circular arc of the generating screw profile, j and j' being integers which pass jointly through all the values in the range from 1 to the number of circular arcs n or n' respectively.

The profiles of screw elements used according to the invention are distinguished in that they may be designed solely using a set square and pair of compasses. The tangential transition between the jth and the (j+1)th circular arc of the generating screw profile is thus designed by describing a circle with the radius $r_{j+1}$ about the end point of the jth circular arc, and the point of intersection, located closer to the point of rotation of the generating screw profile, of this circle with the straight line which is defined by the center point and the end point of the jth circular arc is the center point of the (j+1)th circular arc. In practice, instead of a set square and pair of compasses, computer software is used to design the screw profiles.

A predetermined screw profile of a first screw of a twin-screw extruder (the "generating" profile) unambiguously establishes the screw profile of a neighboring second screw (the "generated" profile). The screw profile of a first screw of the twin-screw extruder is therefore known as the generating screw profile, while the screw profile of the neighboring second screw of the twin-screw extruder is known as the generated screw profile. In the case of a multi-screw extruder, neighboring screws are always arranged alternately with a generating screw profile and a generated screw profile.

The screw elements used in the process according to the invention may be asymmetrical or symmetrical; the screw elements used according to the invention are preferably symmetrical. Symmetrical screw elements may be axially symmetrical or point-symmetrical; screw elements used according to the invention are preferably axially symmetrical.

An axially symmetrical screw profile with the number of flights Z may be divided into 2Z symmetrical parts, it being possible to convert the symmetrical parts into one another by mirroring at the axes of symmetry. Due to its symmetry, the profile of an axially symmetrical screw element with a number of flights Z is thus completely defined by a profile portion in a sector of 360°/(2·Z) which lies between two axes of symmetry of the profile. The remainder of the profile is obtained by mirroring the profile portion at the Z axes of symmetry which intersect at the point of rotation and subdivide the 360° angle about the point of rotation into 2·Z angles of the magnitude 360°/(2·Z). In axially symmetrical screw elements, the corresponding screw profiles of neighboring screws (generating and generated profile) are furthermore identical or may be superimposed in alignment by rotation [1].

A similar situation applies to point-symmetrical screw profiles, in which the symmetrical parts may in each case be converted into one another by point mirroring at the center of symmetry.

One particular embodiment of screw elements used according to the invention is described below which is distinguished in that the screw elements are axially symmetrical. The number of flights Z of such axially symmetrical screw elements used according to the invention preferably amounts to 2 to 8; it particularly preferably amounts to 2 to 4.

The profile curve of the cross section of axially symmetrical screw elements used according to the invention may be subdivided into 2·Z profile portions, which can be converted into one another by axial mirroring at the axes of symmetry of the profile. The number of circular arcs n which form one of the profile portions preferably amounts to 2 to 8, particularly preferably to 2 to 4.

The profile of axially symmetrical screw elements used according to the invention with the number of flights Z is distinguished in that, within one profile portion in a sector of 360°/(2·Z), there is only a single point $P_A$ which is at a distance from the point of rotation which corresponds to the outer radius ra of the screw element. In other words, there is only one point $P_A$ within the profile portion which lies on a circle about the point of rotation with the outer radius ra (outer circle).

Figure 2A:
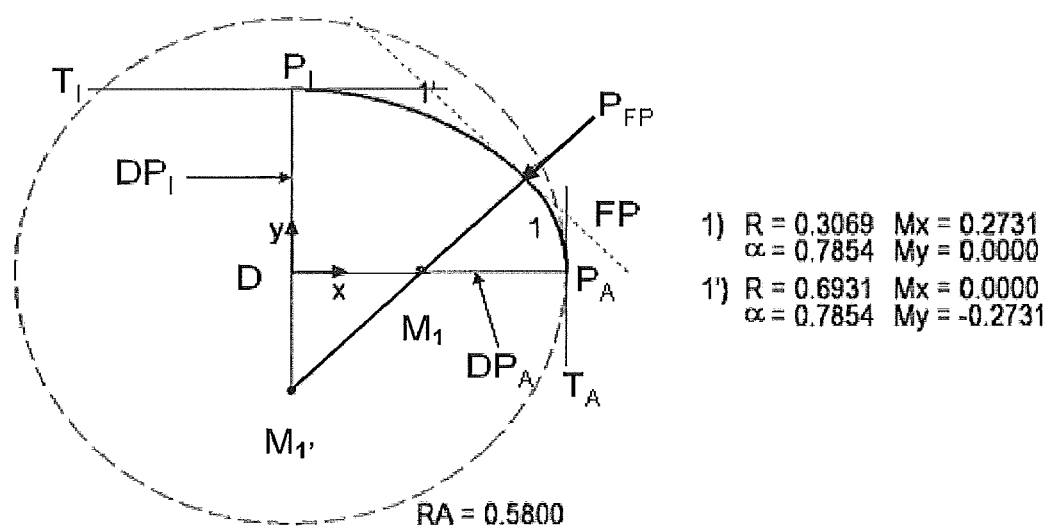
FIG. 2a illustrates a non-limiting example of a profile of axially symmetrical screw elements according to the present disclosure.

While in screw profiles according to the prior art all points in the region of the tip angle KW clean the barrel with a narrow gap (see for example FIG. 1), in the profile of axially symmetrical screw elements used according to the invention it is only the indicated point $P_A$ on the outer radius (see for example FIG. 2a).

For reasons of practicality, the remainder of the description will be based on a Cartesian system of coordinates, the origin of which is formed by the point of rotation D of a screw element. The x axis of the Cartesian system of coordinates passes through the point $P_A$; the y axis is perpendicular to the x axis at the point of rotation D. FIG. 2a shows such a system n of coordinates.

It is furthermore sensible to make use of dimensionless characteristic values, so as to simplify transferability to different extruder sizes. An appropriate reference variable for geometric variables such as for example lengths or radii is the centerline distance a, since this variable cannot be modified in an extruder. The following conventions apply to the figures: the coordinates x and y have their origin in the point of rotation of one of the screws. All angles are stated in radians. All other dimensional indications are normalized to the centerline distance and are represented by capital letters: $A=a/a$; $R_j=r_j/a$; $RA=ra/a$; $RI=ri/a$ etc.

The profile portion of an axially symmetrical screw element used according to the invention is characterized in that, between the point $P_A$, which lies on the outer radius of the profile, and a point $P_I$, which lies on the core radius of the profile, it is composed of circular arcs which merge tangentially into one another, wherein the straight lines $DP_A$ and $DP_I$, which pass through the points $P_A$ and $P_I$ and intersect at the point of rotation D, form an angle of $360°/(2 \cdot Z)$.

Ire one particular embodiment, the profile portion of a screw element used according to the invention is composed between points $P_A$ and $P_I$ of exactly two circular arcs. At a point $P_{FP}$, the circular arcs merge into one another and according to the invention form a constantly differentiable curve over the entire profile portion. At the point $P_{FP}$, the circular arcs form a tangent to a straight line FP. The straight line FP runs at a distance from the point of rotation which corresponds to half the centerline distance A, and it has a gradient (in radians) of $-1/\tan(\pi/(2 \cdot Z))$. The point $P_{F}p$ is at a distance from the point of intersection of a tangent to the outer circle at point $P_A$ with the straight line FP which corresponds to the distance between the point of intersecton and $P_A$. An orthogonal line formed from the point $P_{FP}$ to the straight line FP intersects with the straight line $DP_A$, which passes through the point $P_A$ and the point of rotation, at the center point $M_1$ of a first profile-generating circular arc 1, while it intersects with the straight line $DP_1$, which passes through the point $P_I$ and the point of rotation, at the center point $M_1$, of the other profile-generating circular arc 1' (see FIG. 2a for clarification). The radius $R_1^{2K}$ of the profile generating circular arc 1 thus corresponds to the line segment $M_1P_A$; the radius $R_1^{2K}$ of the circular arc 1' corresponds to the line segment $M_1P_I$.

In one particular further embodiment, the profile portion of a screw element used according to the invention is composed between points $P_A$ and $P_I$ of exactly three circular arcs. An additional degree of freedom is obtained and the profile may be made slimmer in the region of point $P_A$, which cleans the cylinder wall, by selecting a small radius, so further reducing energy dissipation.

Figure 2B:
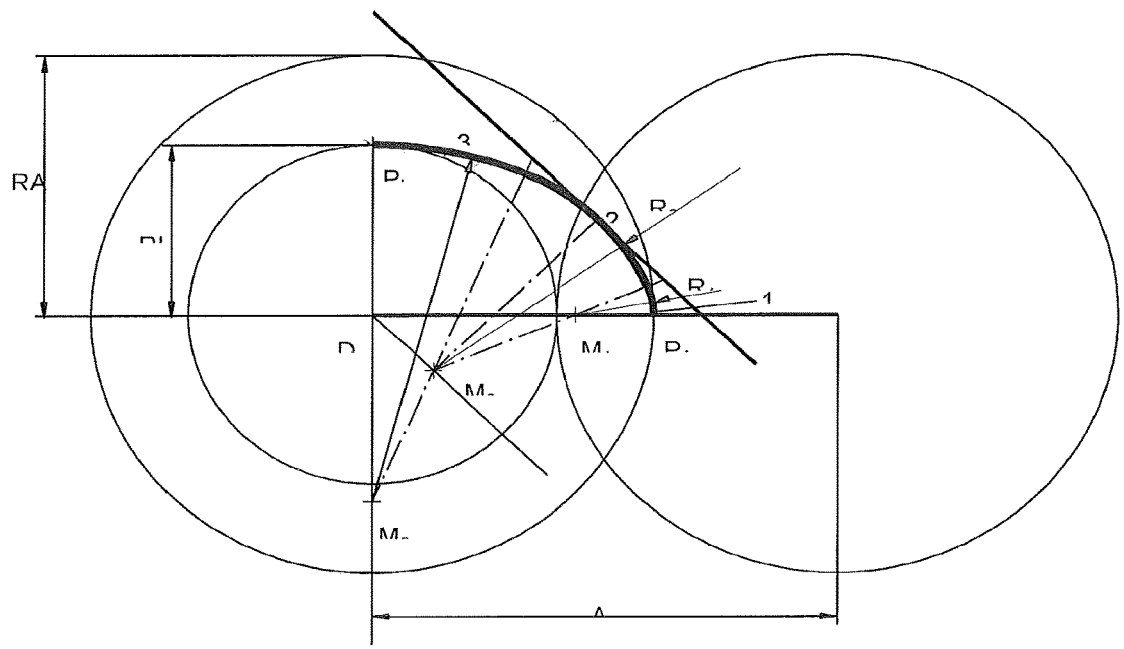
FIG. 2b illustrates a non-limiting example of a profile portion of a double-flighted screw element made up of three circular arcs according to the present disclosure.

FIG. 2b shows by way of example a profile portion of a double-flighted screw element used according to the invention made up of three circular arcs. The radius $R_1$ of the circular arc 1, which adjoins point $P_A$, may be freely selected within the limits $0 < R_1 < R_1^{2K}$. Its center point $M_1$ lies on the connecting line segment $D-P_A$.

The radius of the circular arc 3, which adjoins point $P_1$, has a radius of $R_3=A-R_1$. Its center point $M_3$ lies on the line segment $D-P_A$.

Between these two circular arcs is located a constantly differentiable circular arc 2 with the radius $R_2=A/2$. Its center point $M_2$ is located at a distance $A/2-R_1$ from the point $P_1$ and at a distance $R_3-A/2$ from the point $M_3$.

The circular arc 1 is defined, on the one hand, by $P_A$ and, on the other hand, by the point of intersection with the straight line through $P_1$ and $P_2$.

The circular arc 3 is defined, on the one hand, by $P_1$ and, on the other hand, by the point of intersection with the straight line through $M_2$ and $M_3$.

Thanks to the freedom of choice with regard to one of the radii $R_1$ or $R_3$, it is possible to design various fully self-wiping screw profiles used according to the invention for the given centerline distance A. It is thus also possible to design asymmetric screw profiles used according to the invention by providing the same screw profile on mutually corresponding sectors of the magnitude $360°/(2 \cdot Z)$ of the screw profile on both screws, while however constructing sectors of the magnitude $360/(2 \cdot Z)$ differently on one screw. Such designs are advisable if, for the purposes of dispersion tasks, the material being conveyed is to be subjected to specific deformations, for example slow compression followed by rapid expansion.

Screw elements which, within a profile portion of the magnitude $360°/(2 \cdot Z)$, are composed of more than three circular arcs are likewise provided by the present invention. According to the invention, the circular arcs merge tangentially into one another at their start and end points.

The ratio RA=ra/a of the outer radius ra of the screw element to the centerline distance a preferably amounts, for double-flighted screws used according to the invention, to between 0.54 and 0.7 and particularly preferably between 0.58 and 0.63, for triple-flighted screws preferably between 0.53 and 0.57 and particularly preferably between 0.54 and 0.56, and for quadruple-flighted screws preferably between 0.515 and 0.535.

The screw elements used according to the invention may be constructed as conveying elements or kneading elements or mixing elements.

A conveying element is known to be distinguished in that (see for example [1], pages 227-248) the screw profile is rotated and extended continuously helically in the axial direction. The conveying element may have right- or left-handed flights. The pitch t of the conveying element may for example assume values of 0.1 times to 10 times the external diameter, the pitch being taken to mean the axial length which is necessary for one complete rotation of the screw profile. The pitch t is preferably in the range from 0.3 times to 3 times the external diameter. For practical reasons, the axial length of a conveying element is preferably constructed in integral multiples of t/Z.

A kneading element is known to be distinguished in that (see for example [1], pages 227-248) the screw profile extends discontinuously in the axial direction in the form of kneading disks. The kneading disks may be arranged in a right- or left-handed manner or neutrally. The axial length of the kneading disks is preferably in the range from 0.02 to 2 times the external diameter. The axial distance between two neighboring kneading disks is preferably in the range from 0.001 to 0.1 times the external diameter.

As is known, mixing elements are formed (see for example [1], pages 227-248) by constructing conveying elements with openings in the screw tips. The mixing elements may be right- or left-handed. Their pitch t is preferably in the range from 0.1 times to 10 times the external diameter. In a similar manner to the conveying elements, the axial length of a mixing element is preferably constructed in integral multiples of t/Z. The openings preferably take the form of a U- or V-shaped groove. If the mixing element is formed on the basis of an actively conveying element, the grooves are preferably arranged in a counter-conveying or axially parallel manner.

Preferred materials of which the screw elements consist are steels, in particular nitriding steels, chromium, tool and special steels, as well as metallic composite materials based on iron, nickel or cobalt and produced by powder metallurgy.

In multi-screw extruders with screws co-rotating in pairs and being fully self-wiping in pairs, the screw elements used according to the invention form a channel extending over the entire circumference thereof. In this respect, the channel comprises an alternately increasing and decreasing channel width. Such a channel is here described as a convergent-divergent channel. In such a convergent-divergent channel a combination of shear flow and stretching flow, which has a very good dispersive action, arises over its entire length during operation. The energy input is reduced in comparison to conventional screw elements with a kink in the profile known from the prior art.

Eccentrically arranged circular disks likewise form a convergent-divergent channel. However, the screw elements used according to the invention comprise a smaller circumferential zone, in which a very narrow gap is present, than eccentrically arranged circular disks. Therefore, in this method energy input is reduced with the screw elements used according to the invention in multi-screw extruders compared with the use of eccentrically arranged circular disks.

It is known to a person skilled in the art that directly self-wiping screw profiles cannot be inserted directly into a twin-screw extruder, but rather clearances are necessary between the screw elements and the barrel and between the screw elements themselves. Excessively large clearances reduce the self-cleaning effect and have a negative effect on conveying action and pressure build-up. Excessively small clearances increase energy input and lead to an undesired increase in the temperature of the plastic compositions. For screw profiles of screw elements used according to the invention, clearances in the range from 0.001 to 0.1, relative to the diameter of the screw profile, are used, preferably from 0.002 to 0.05 and particularly preferably from 0.004 to 0.02. The clearances may, as is known to a person skilled in the art, be of different dimensions or identical between screw and barrel and between screw and screw. The clearances may also be constant or, within the stated limits, variable. It is also possible to displace a screw profile within the clearances. Methods are known to a person skilled in the art for deriving a screw profile with clearances from a predetermined, fully self-wiping screw profile. Known methods for achieving this are for example the possibility, described in [1] on page 28 et seq., of centerline distance enlargement, longitudinal section offsets and three-dimensional offsets, all of which are known to a person skilled in the art. In the case of centerline distance enlargement, a screw profile of a relatively small diameter is constructed and spaced further apart by the amount of clearance between the screws. In the longitudinal section offset method, the longitudinal section profile curve (parallel to the axis of rotation of the respective element) is displaced by half the screw-screw clearance inwards perpendicularly to the profile curve, in the direction of the axis of rotation. In the three-dimensional offset method, starting from the three-dimensional curve on which the screw elements clean one another, the screw element is reduced in size in the direction perpendicular to the faces of the fully self-wiping profile by half the clearance between screw and screw. The longitudinal section and three-dimensional offset methods are preferred, the three-dimensional offset method being particularly preferred.

The invention is explained in greater detail below by way of example with reference to the figures without however being restricted thereto.

Sensibly, dimensionless characteristic values are used, in order to simplify transferability to different extruded sizes. An appropriate reference variable for geometric variables such as for example lengths or radii is the centerline distance a, since this variable cannot be modified in an extruder.

The following conventions apply to the figures: the coordinates x and y have their origin in the point of rotation of one of the screws. All angles are stated in radians. All other dimensional indications are normalized to the centerline distance and are represented by capital letters: A=a/a; $R_j=r_j/a$; RA=ra/a; RI=n/a T=t/a etc. Mx and My are the x- and y-coordinates of the circle center point of a profile-generating circular arc, R is the radius normalized to the centerline distance a and α the arc angle of the circular arc. Further abbreviations: RG=normalized barrel radius, RV=normalized virtual barrel radius, RA=normalized outer radius of the fully self-wiping profile, RF=normalized outer radius of the screw to be manufactured, S=normalized clearance of the screws relative to one another (gap), D=normalized clearance of screw to barrel, VPR=normalized amount of profile displacement, VPW angle of profile displacement in radians, VLR=normalized amount of left-hand screw displacement, VLW=angle of left-hand screw displacement, VRR=normalized amount of right-hand screw displacement, VRW=angle of right-hand screw displacement.

FIG. 1 is cross-sectional representation of two fully self-wiping, double-flighted screw elements according to the prior art arranged at a distance A from one another. The screw elements have the same axially symmetrical profile. The right-hand screw element is rotated by 90° relative to the left-hand one. The points labelled 1-1 indicate the points of rotation of the screws, on which the screw elements are arranged. The profile shown is composed of a plurality of symmetrical portions. At the transitions of the portions kinks arise (one of the kinks is indicated by an arrow numbered 1-2). In the region of the tip angle KW the product is subject to high shear without elongation during operation of a multi-screw extruder with such screw elements.

This disadvantage is avoided by a screw element used according to the invention with a profile according to FIG. 2. FIG. 2a shows in cross-section a quarter of the profile of a double-flighted fully self-wiping screw element (generating screw element). The profile is axially symmetrical relative to the x and y axes, such that the entire profile would be obtained by mirroring of the illustrated quarter at the x and y axes. The profile of the corresponding (generated) screw element is then obtained by rotating the profile of the generating screw element by an angle of 90°. In this and all further figures, the coordinate origin marks the point of rotation D of the screw. With the outer radius RA a dashed circle was drawn around the profile. The barrel bore is represented by a circle concentric thereto with a radius RG enlarged relative to the outer radius by the clearance S. (RG=RA+S) The screw profile according to FIG. 2a consists of two circular arcs, which merge together without a kink. The coordinates of the circular arcs are stated in FIG. 2a.

The center point MI of the circle 1 lies on the horizontal through the point of rotation and the center point M1, of the circle 1' on the vertical through the point of rotation ($M1_y=0$; $M1_{'x},r=0$). The transition from circle 1 to circle 1' proceeds at the point $P_{FP}$, in which the two circles form a tangent to the straight line FP.

The illustrated profile portion may be designed with the following steps:
- establishing a point $P_A$ at a distance from the point of rotation D of the screw element which corresponds to the outer radius RA of the screw element,
- establishing a point $P_I$ at a distance from the point of rotation D of the screw element which corresponds to the internal radius RI of the screw element, wherein point Pi lies on a straight line $DP_I$ through the point D, which forms an angle of 360°/(2·Z) with a straight line $DP_A$ through the points $P_A$ and D,
- establishing a straight line FP at a distance from the point of rotation D which corresponds to half the centerline distance A of the screw element, and with a gradient in radians of $-1/\tan(\pi/(2 \cdot Z))$,
- establishing the point of intersection of the tangent $T_A$ at point $P_A$ to the outer circle with radius RA about the point of rotation D with the straight line FP and establishing the point $P_{FP}$ on the straight line FP which is at the same distance from the point of intersection as $P_A$ and which is at a smaller distance from the point of rotation than the radius RA,
- establishing the center point $M_1$, which lies at the point of intersection of the orthogonal to the straight line FP at the point $P_{FP}$ with the straight line $DP_A$,
- establishing the center point $M_1$, which lies at the point of intersection of the orthogonal to the straight line FP at the point $P_{FP}$ with the straight line $DP_I$,
- generating a circular arc 1 about the center point $M_1$ between the points $P_A$ and $P_{FP}$,
- generating a circular arc 1 about the center point $M_1$, between the points $P_1$ and $P_{FP}$.

FIG. 2b shows by way of example a profile portion of a double-flighted screw element used according to the invention consisting of three circles. Point D labels the point of rotation of the screw element (generating screw element). At a distance A from the point of rotation D is located the point of rotation of the corresponding screw clement (generated screw element). Drawn around the point of rotation D are a circle (inner circle) with the core radius RI and a circle (outer circle) with the outer radius RA of the screw element. Inner circle and outer circle form a circular ring. All the points of the profile portion and of the resultant overall profile of the screw element used according to the invention lie on this circular ring. Point $P_A$ indicates a starting point of a first circular arc 1 with the radius $R_1$ and the center point $M_1$, which lies on the connecting line segment D-$P_A$. The point $P_A$ lies on the outer circle. Point $P_I$ indicates a starting point of a circular arc 3 with the radius $R_3=A-R_I$. Its center point $M_3$ lies on the line segment D-$P_1$. Between the circular arc 1 and the circular arc 3 is located a constantly differentiable circular arc 2 with the radius $R_2=A/2$. Its center point $M_2$ is located at a distance $(A/2)-R_1$ from the point $P_1$ and at the distance $R_3-(A/2)$ from the point $M_3$. By continuous mirroring of the illustrated profile portion at a straight line which runs through the points D and $P_A$ and at a straight line which runs through the points D and $P_I$, it is possible to design the overall profile of the screw element used according to the invention (generating screw element). The profile of the corresponding screw element (generated screw element) is obtained simply by rotating the profile of the generating screw profile by an angle of 90° about the point of rotation D.

Figure 2C:
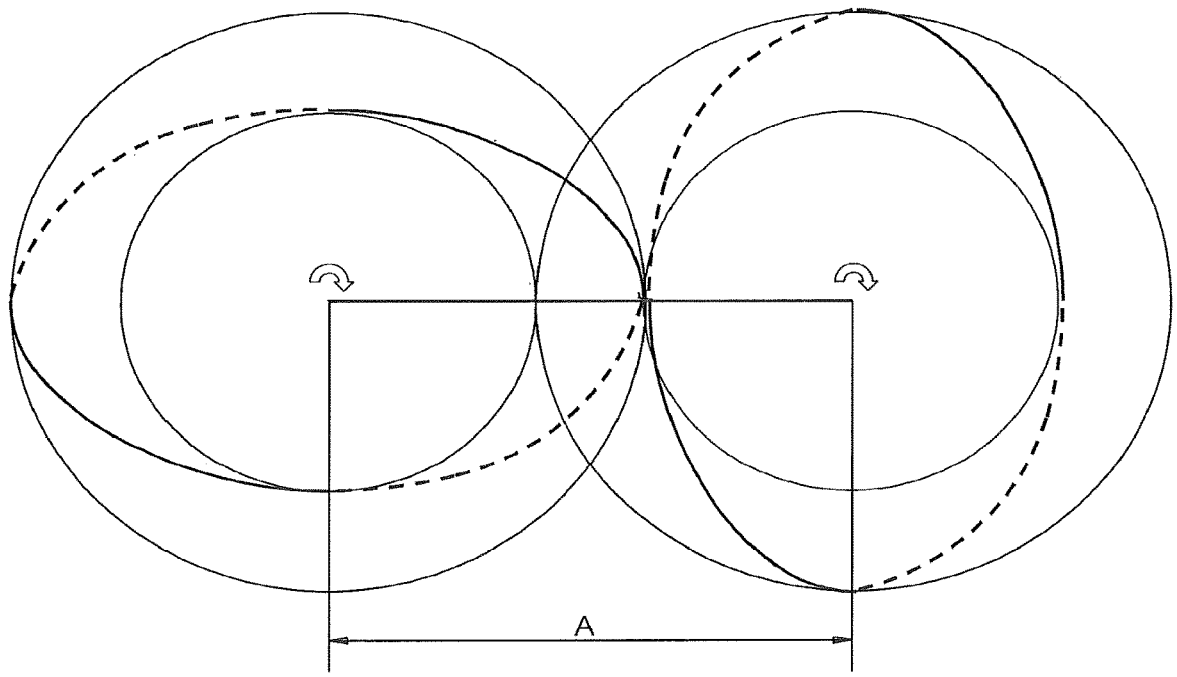
FIG. 2c illustrates a non-limiting example of screw elements in which the profiles are point-symmetrical with the point of rotation according to the present disclosure.

FIG. 2c shows an example of screw elements used according to the invention, in which the profile portions shown by dashed lines cannot be superimposed in alignment with the profile portions shown by continuous lines by axial mirroring. Instead the profiles are point-symmetrical with the point of rotation.

Figure 3:
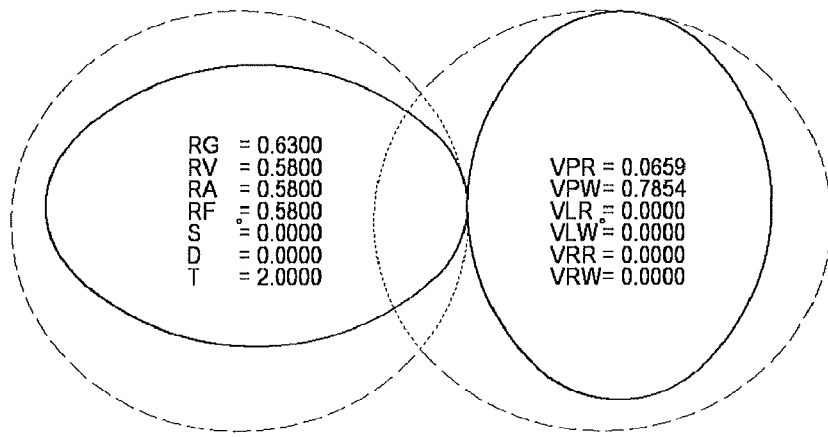
FIG. 3 illustrates a non-limiting example of screw elements according to the present disclosure.
Figure 4A:
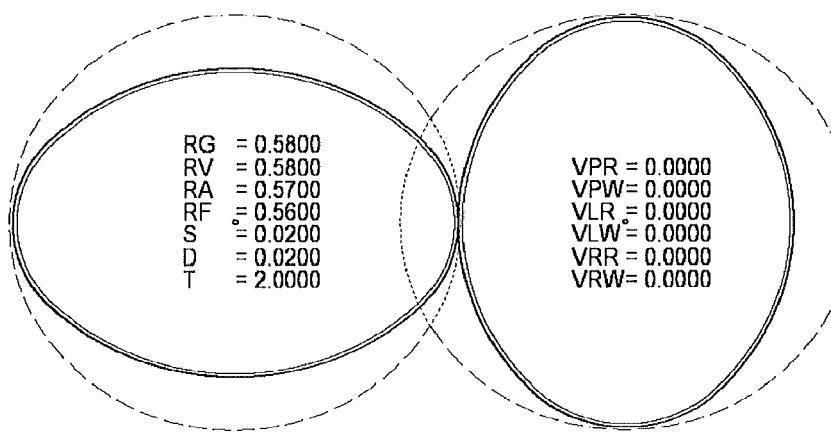
FIG. 4a-4d illustrate non-limiting examples of profiles of screw elements with gaps (clearances) according to the present disclosure.
Figure 4B:
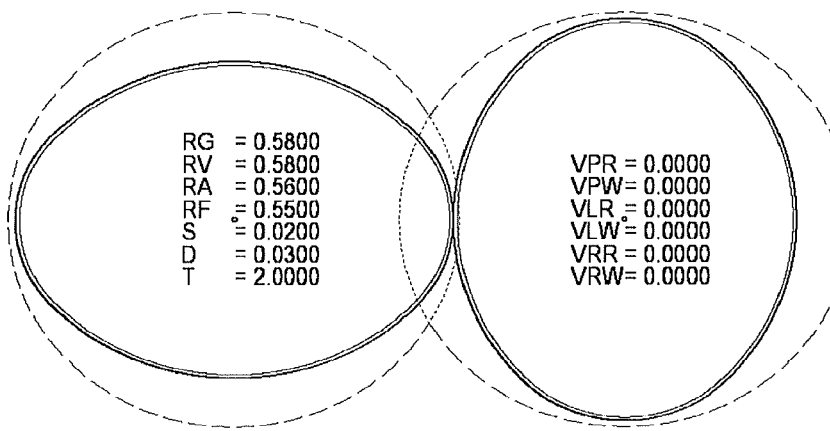
Figure 4C:
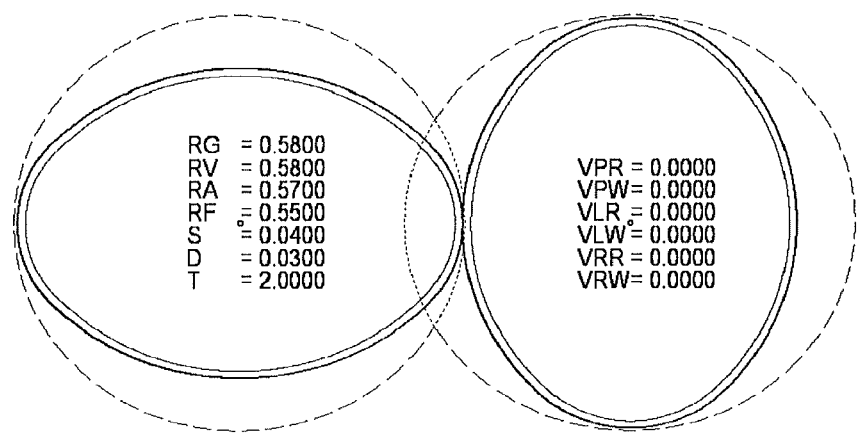
Figure 4D:
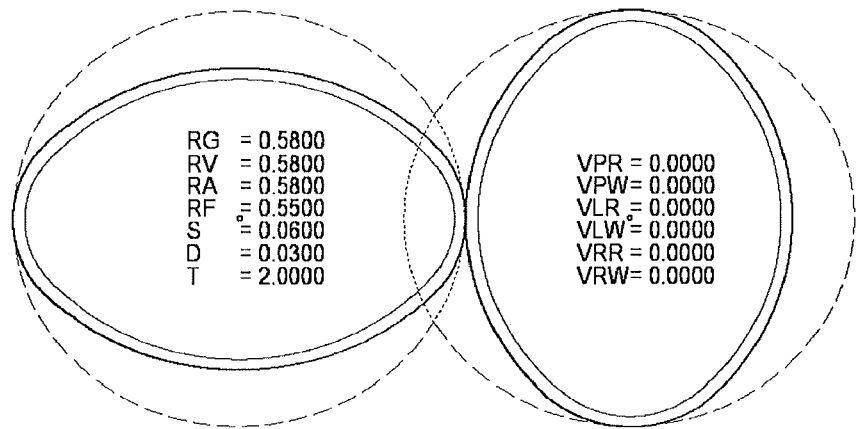
Figure 5A:
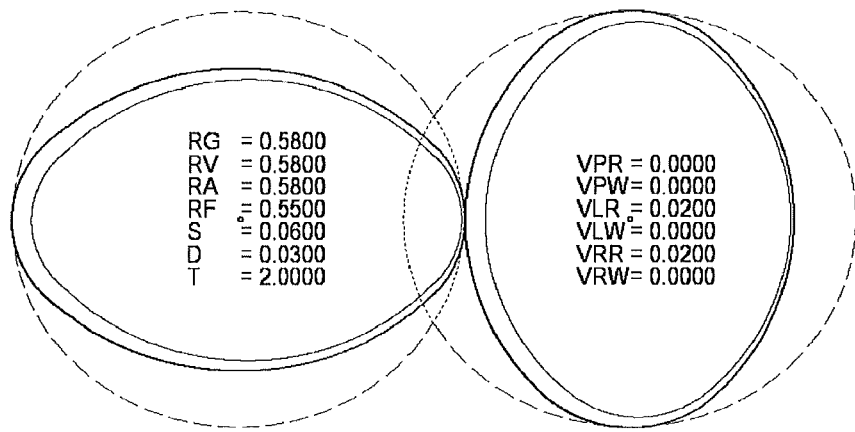
FIGS. 5a-5d illustrate non-limiting examples of eccentric profiles according to the present disclosure.
Figure 5B:
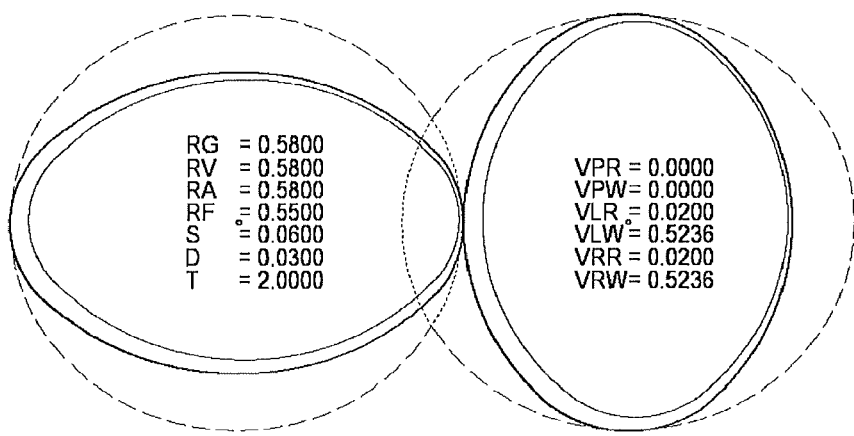
Figure 5C:
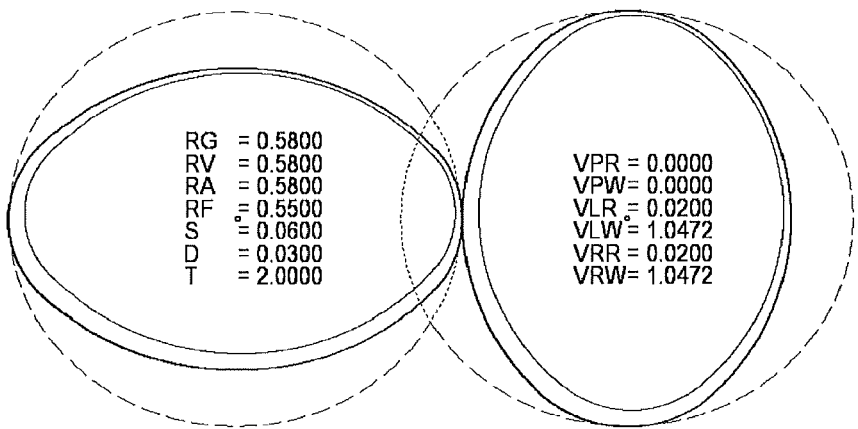
Figure 5D:
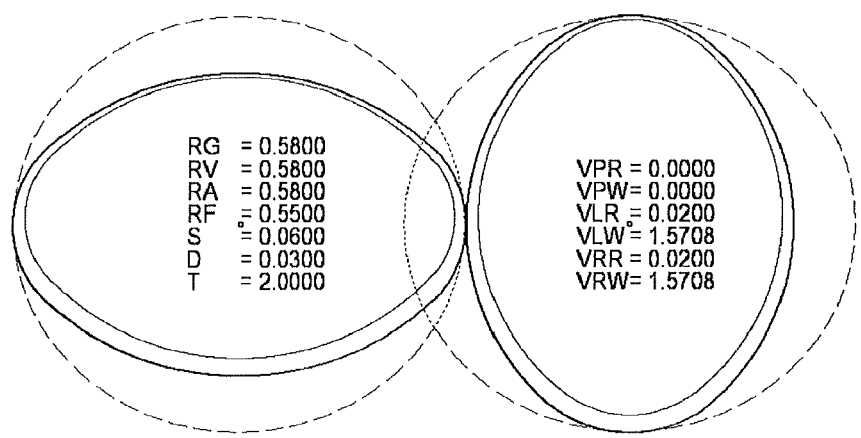

A particular embodiment of screw elements used according to the invention is illustrated by way of example in FIG. 3. It is characterized in that the barrel bores are constructed with a larger radius than the outer radius of the screw profiles and the screw profiles are displaced in pairs relative to the center points of the barrel bores, but the points of rotation (shown by small circles) in the centers of the barrel bores are retained. In this way, a further, distinct reduction in energy input is surprisingly obtained. The thus eccentrically rotating screw elements may be displaced in any desired manner within the barrel bores. FIG. 3 shows the case to be particularly emphasized, with the two profiles displaced in parallel by the same amount towards a straight line, which passes through the two points of rotation, as perpendicular thereto, until they touch the barrel contour. In this way it is ensured that the screws are fully self-wiping, but only in each case one of the two screw tips of each screw fully wipes the barrel. This arrangement permits complete cleaning of all surfaces with simultaneously reduced energy input.

The text has hitherto related only to fully self-wiping screw profiles. In machines constructed industrially, it is, however, necessary to deviate from the fully self-wiping geometry to such an extent that precisely defined gaps are maintained during cleaning. This is necessary in order to prevent metallic "fretting", to compensate for manufacturing tolerances and to avoid excessive energy dissipation in the gaps. There are various possible strategies for producing uniform gaps. The most widespread is the production of gaps which are equidistant over a longitudinal section through the machine. The procedure for generating the corresponding screw profiles was shown in [1] on pages 103 et seq.

The rules for generating screw profiles with defined gaps are applicable to the screw elements used according to the invention.

FIG. 4 shows examples of profiles of screw elements used according to the invention with gaps (clearances). In FIG. 4a, the gap S on mutual cleaning of the screws was selected to be identical to the gap D on cleaning of the barrel. In FIG. 4b, gap S is smaller than D and in FIGS. 4c and 4d D is conversely smaller than S.

FIG. 5 shows that eccentric profiles used according to the invention may also be obtained by designing a screw profile with gaps and then displacing the profiles within the gaps. The profiles of FIGS. 5a-d are identical to the profile from FIG. 4d. Displacement proceeds in relation to a straight line through the points of rotation of the screw elements by an angle of 0° in FIG. 5a, an angle of 30° in FIG. 5b, an angle of 60° in FIG. 5c and an angle of 90° in FIG. 5d.

FIG. 5 shows examples in which both screws are displaced by the same displacement vector. It is, in principle, also possible to displace both screws by a different vector within the clearances. In this case, profiles are obtained which clean one another with a gap which varies over one revolution of the screws.

Figure 6A:
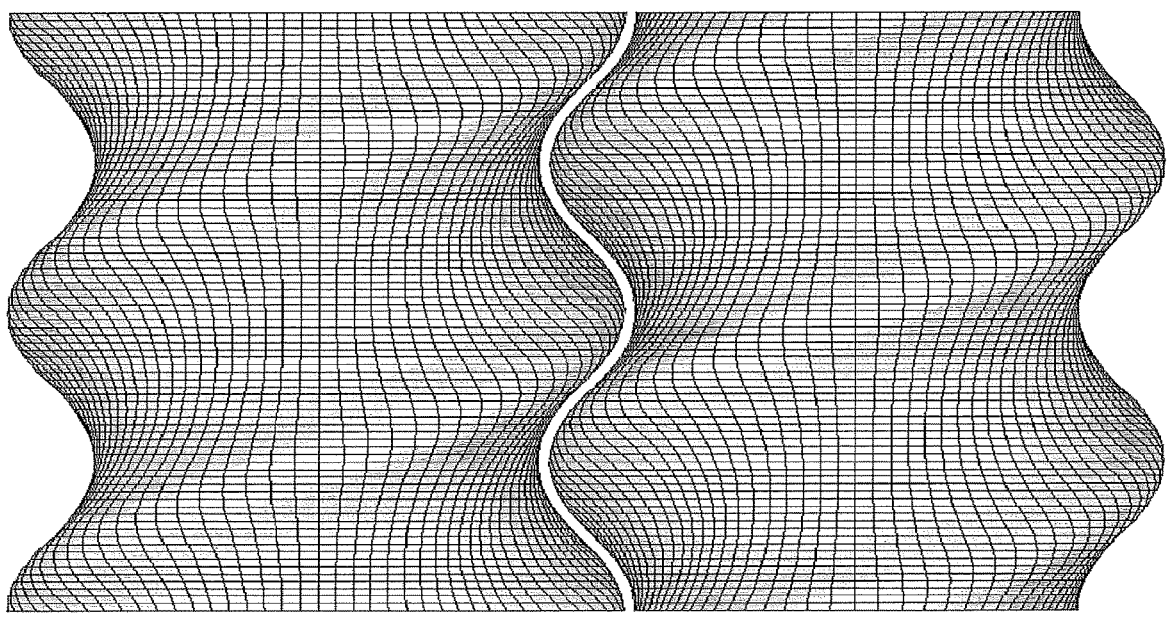
FIG. 6a illustrates a non-limiting example of a conveying thread obtained by continuously helically rotating a pair of profiles in the axial direction according to the present disclosure.

As is known, the conveying action of a pair of profiles comes about by the profiles being continuously helically rotated in the axial direction. A conveying thread is obtained in this manner, as is illustrated by way of example in FIG. 6a.

Figure 6B:
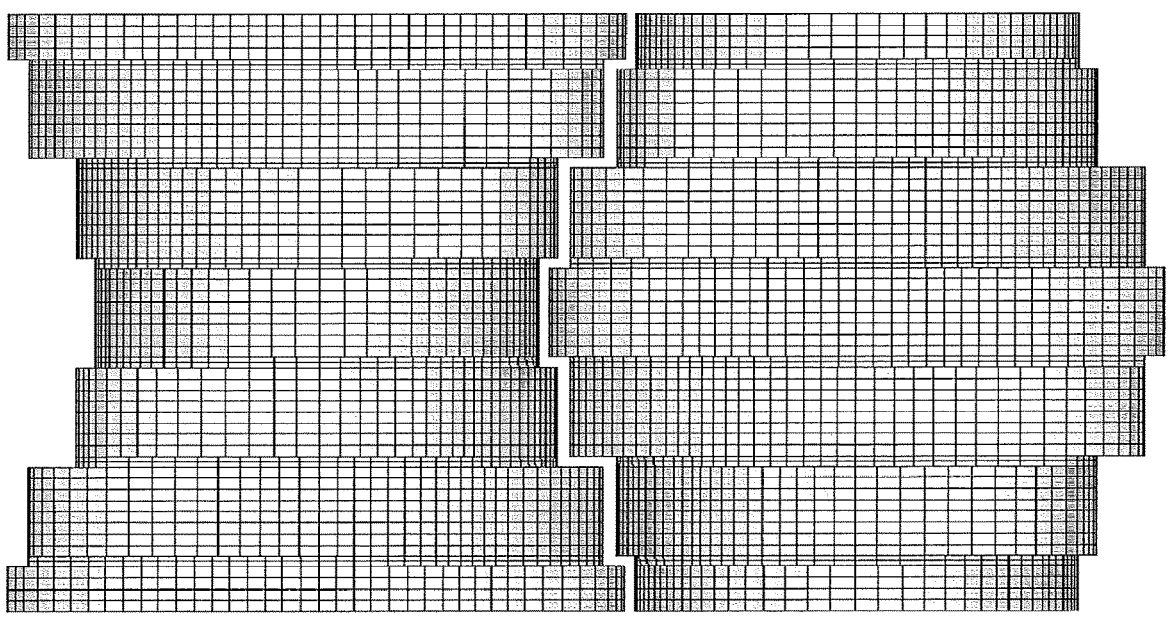
FIG. 6b illustrates a non-limiting example of a kneading element with seven kneading disks arranged on the axis at an offset angle of 30° according to the present disclosure.

Kneading elements with an elevated dispersing capacity relative to the conveying thread are obtained by arranging self-cleaning profile prismatic disks twisted by an offset angle relative to one another on the axis. FIG. 6b shows an example of a kneading element with seven kneading disks which are arranged on the axis at an offset angle of 30°.

Figure 7:
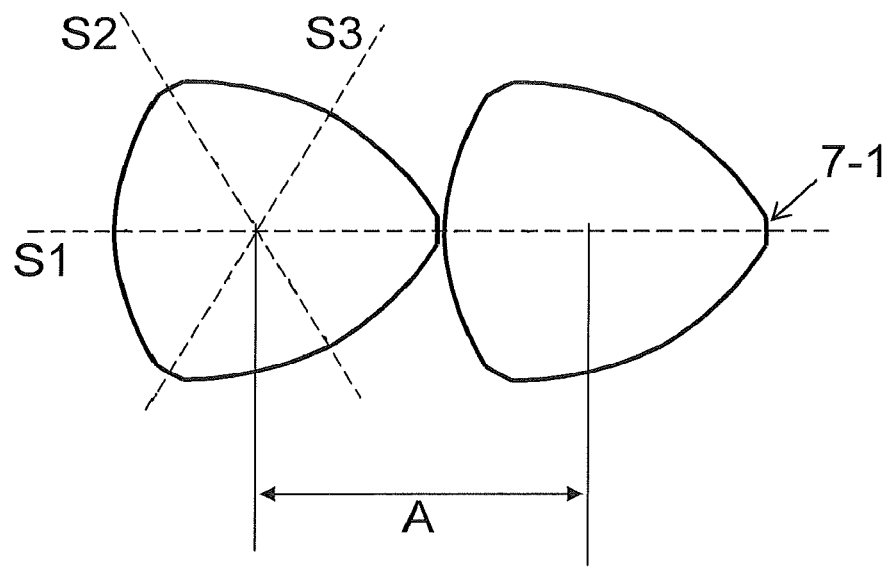
FIG. 7 illustrates a cross-section of two triple-flighted screw elements according to the prior art.

FIGS. 1 to 6 deal solely with double-flighted screw elements. However, the same principles may also be applied to screw elements with three or more flights. FIG. 7 is a cross-sectional illustration of two triple-flighted screw elements according to the prior art (see for example [1] p. 103). The triple-flighted profile in FIG. 7 consists of three symmetrical portions. At the transitions of the portions kinks occur, and the profile forms the screw tip (labelled by way of example by the arrow numbered 7-1d). Here the profile rotates at a short distance from the barrel and imparts pure shear to the polymer melt, with the described disadvantages.

Figure 8:
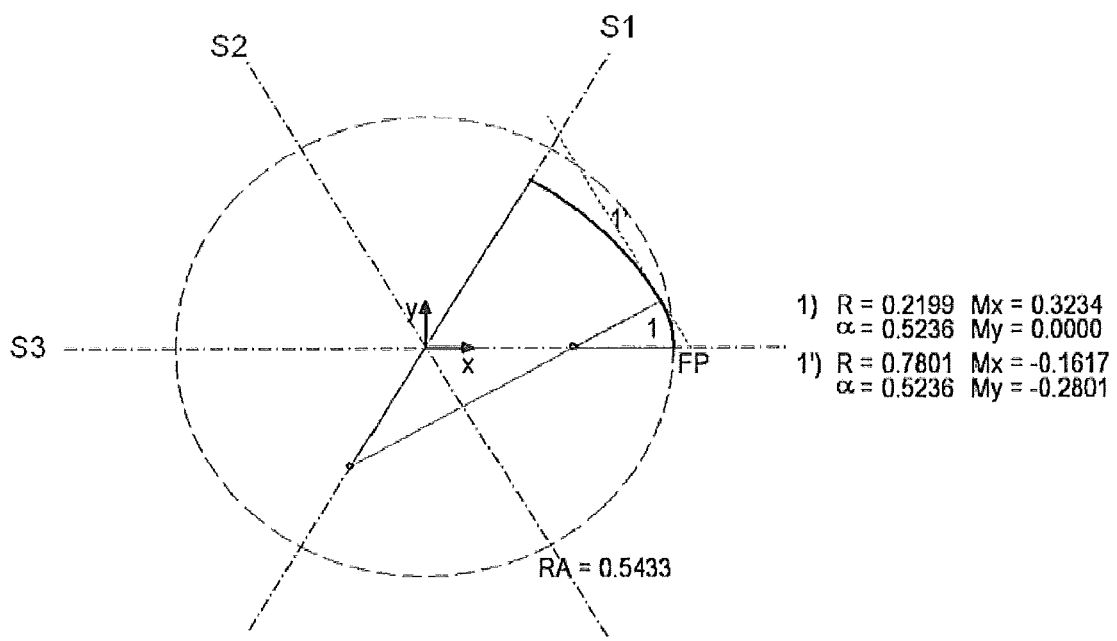
FIG. 8 illustrates a non-limiting example of a profile portion of a triple-flighted screw element according to the present disclosure.

FIG. 8b, on the other hand, shows a profile portion of a triple-flighted screw element used according to the invention. Since the profile is axially symmetrical with regard to three straight lines (S1, S2, S3) arranged at angles of 60° relative to one another and which pass through the coordinate origin, here only one 60° sector is shown. The entire profile is obtained by continuous mirroring of the illustrated profile curve at the mirroring lines S1, S2 and S3. The profile curve is made up of two circular arcs in the illustrated portion between the straight lines S1 and S3. For the screw a convergent-divergent channel arises, which over its entire circumference imparts a combination of shear flow and stretching flow to the composition. The tangential transition between the profile-generating circles 1 and 1' proceeds at the point at which the profile forms a tangent with straight line FP. For triple-flighted profiles the straight line FP extends at a distance of half the centerline distance from the point of rotation with a gradient of −1.73. The design shown in FIG. 8 may be applied in a similar manner for all ratios of outer screw radius to centerline distance from 0.5 to 0.577.

Figure 9A:
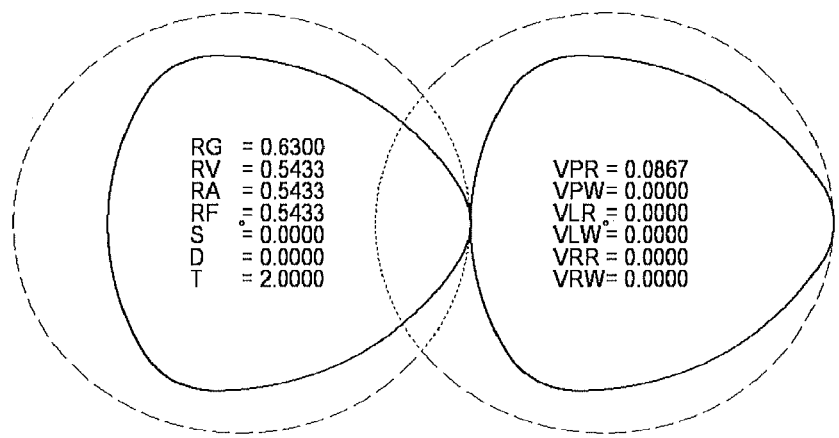
FIGS. 9a-9d illustrate non-limiting examples of eccentrically rotating, triple flight screw profiles according to the present disclosure.
Figure 9B:
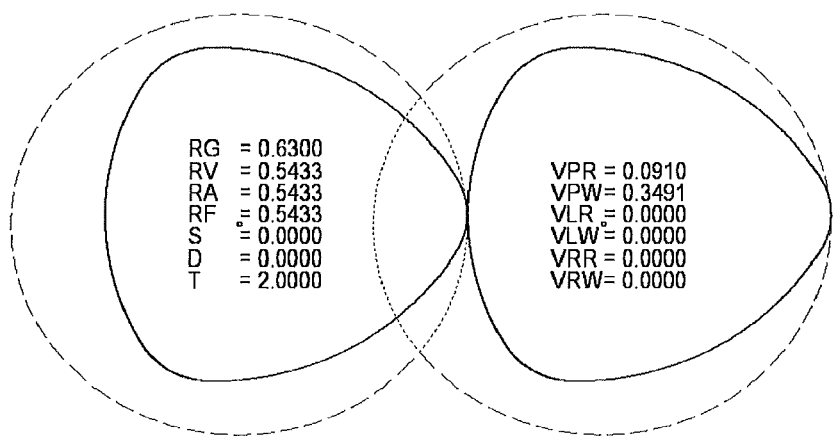
Figure 9C:
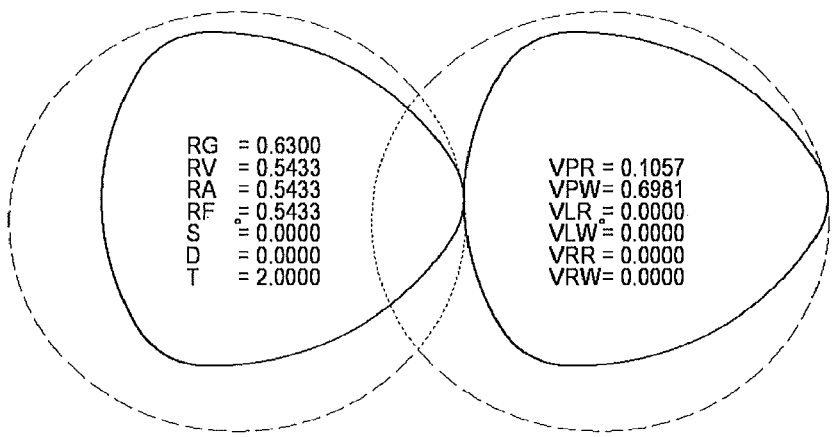
Figure 9D:
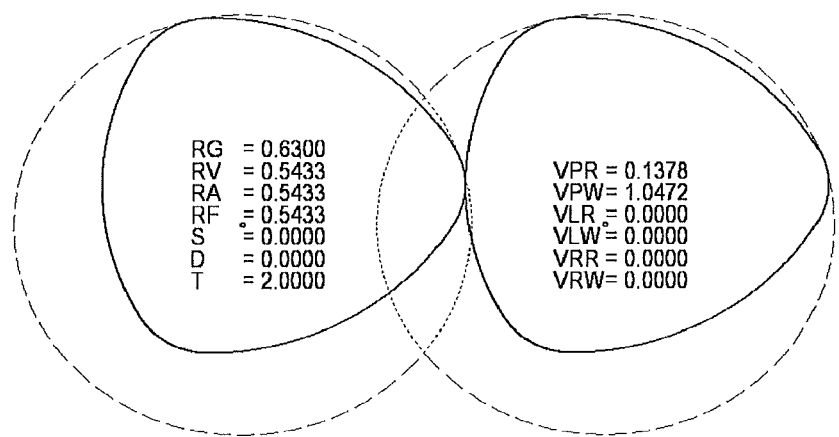

For triple-flighted profiles eccentrically rotating profiles may be designed. Such screw profiles are shown in FIG. 9a-d. The procedure is similar to the procedure for double-flighted profiles. The outer radius of the profile is reduced in size relative to the barrel radius and the profile is displaced in pairs, wherein the point of rotation is kept central relative to the barrel. Of particular interest are screw profiles in which the screws fully clean one another and where the barrel is cleaned with just one of three tips. FIG. 9a shows the generation of such a profile by displacing the profile horizontally to the right, until the right-hand screw tip arrives at the barrel contour. With this arrangement symmetrical screw flights arise between the profile and the barrel. Further arrangements, in which one of the three screw tips cleans the barrel, are obtained with displacement of the profiles by an angle of 20° (FIG. 9b) or 40° relative to a straight line, which passes through the points of rotation (FIG. 9c). With these profiles the resultant screw flight is asymmetric. With increasing displacement a region arises with more intensive shear (at the top in FIGS. 9b and 9c) and a region with less intensive shear (at the bottom in FIGS. 9b and 9c). When the profile is displaced at an angle of 60° with regard to a straight line, which passes through the points of rotation (FIG. 9d), an arrangement may be produced in which two of three tips clean the barrel. The asymmetry is here at its most pronounced. Two regions arise with very intensive shear stress (top of FIG. 9d) and one region with low shear stress (bottom of FIG. 9d). The composition to be processed is thus exposed to greatly varying stresses, which is helpful for dispersion tasks.

The production of gaps during mutual cleaning of the profiles and during cleaning of the barrel proceeds in full conformity with the procedure for double-flighted profiles.

Figure 10A:
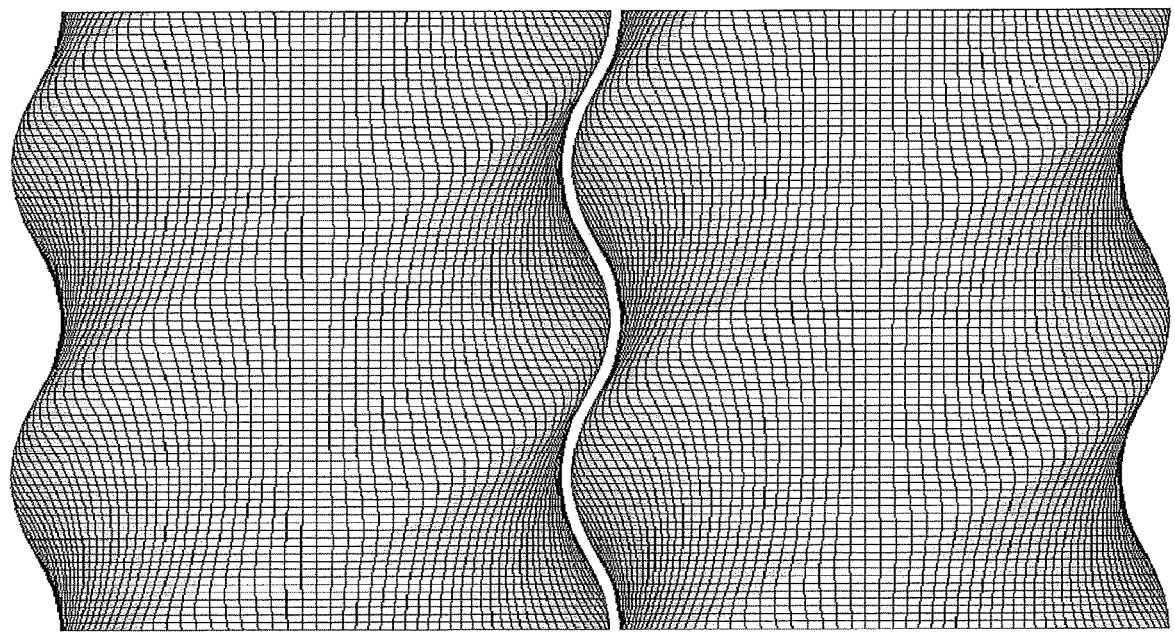
FIG. 10a illustrates a non-limiting example of triple-flighted profiles as a continuous conveying thread according to the present disclosure.
Figure 10B:
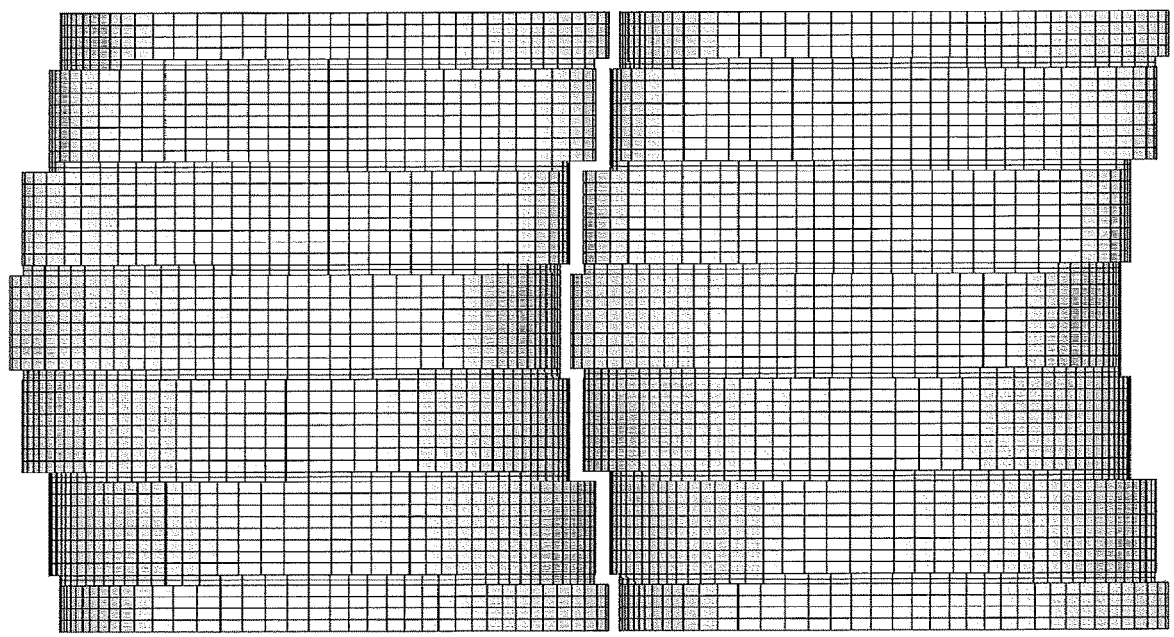
FIG. 10b illustrates a non-limiting example of triple-flighted profiles as kneading disks according to the present disclosure.

The triple-flighted profiles may be used according to the invention as a continuous conveying thread according to FIG. 10a or as kneading disks according to FIG. 10b.

Figure 11:
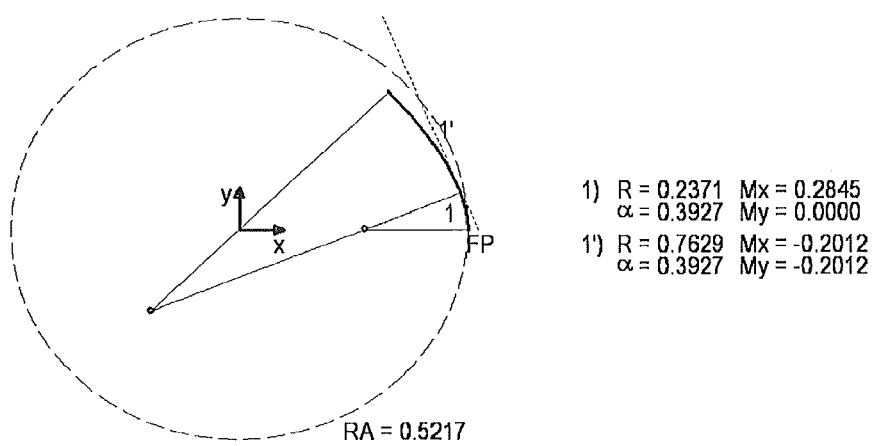
FIG. 11 illustrates a non-limiting example of a profile portion of an axially symmetrical, quadruple-flighted screw element composed of two circle segments according to the present disclosure.

Axially symmetrical quadruple-flighted screw profiles are completely defined by a 45°-portion of the screw profile. FIG. 11 shows a profile portion of an axially symmetrical, quadruple-flighted screw element used according to the invention, which is composed of two circle segments. The design may be applied analogously for all ratios of outer screw radius to centerline distance of 0.5 to 0.541.

The generation of eccentric profiles and the generation of gaps when cleaning proceeds in a similar manner to double- and triple-flighted profiles and is not shown here.

Figure 12A:
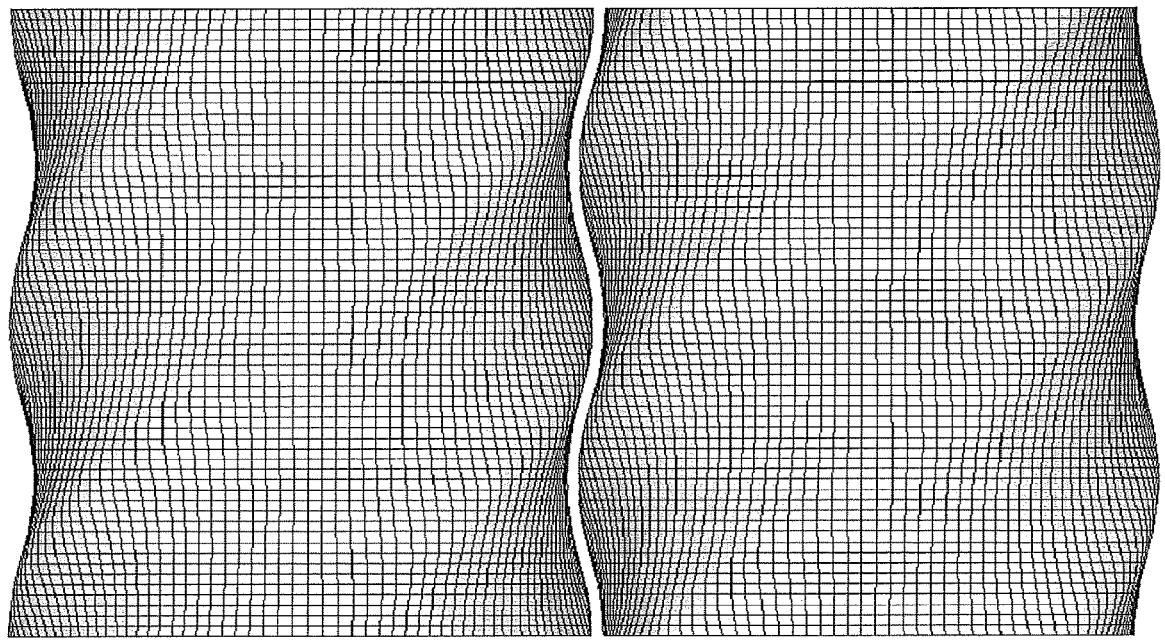
FIG. 12a illustrates a non-limiting example of quadruple-flighted profiles as a continuous conveying thread according to the present disclosure.
Figure 12B:
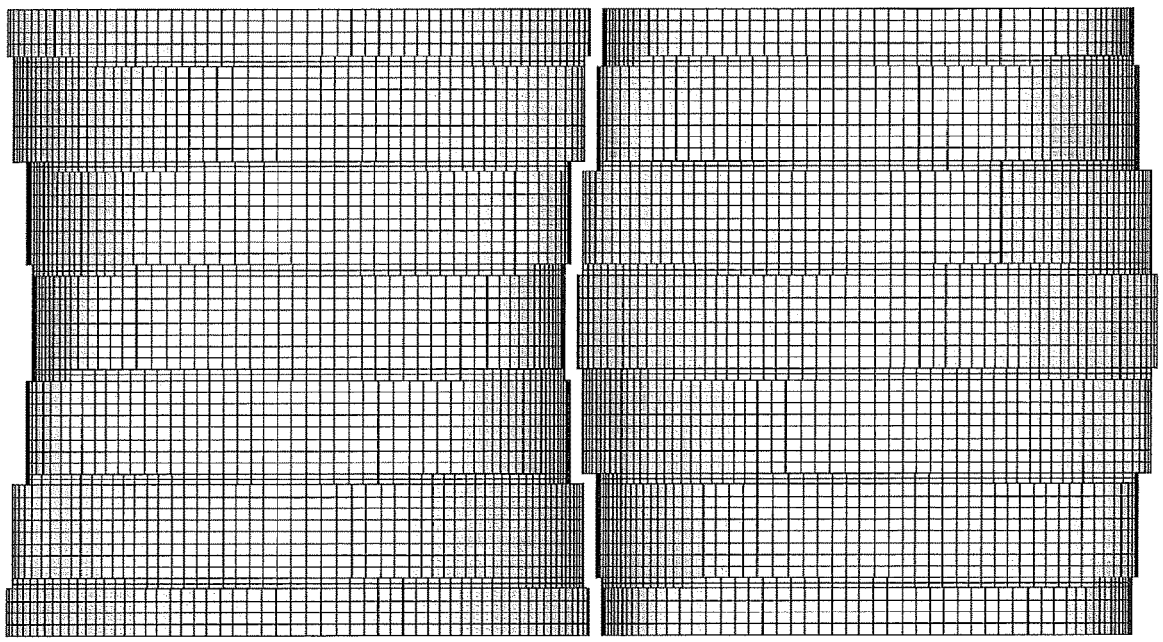
FIG. 12b illustrates a non-limiting example of quadruple-flighted profiles as kneading disks according to the present disclosure.

The quadruple-flighted profiles may be used as a continuous conveying thread according to FIG. 12a or as kneading disks according to FIG. 12b.

Profiles used according to the invention with more than four flights may be produced analogously. Likewise, the gaps may analogously be varied and eccentric profiles generated.

Figure 13A:
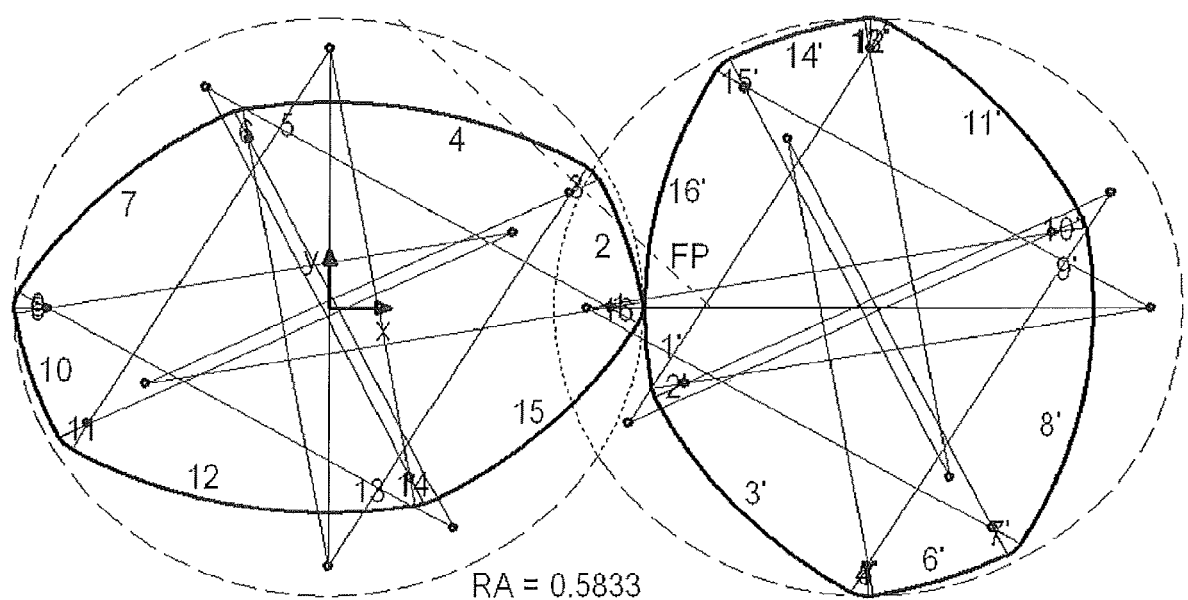
FIG. 13a illustrates a schematic, cross-sectional representation of a non-limiting example of a screw element pair according to the present disclosure.

FIG. 13a is a schematic, cross-sectional representation of an example of a screw element pair used according to the invention. The generating screw profile is illustrated by the left-hand screw profile. The generated screw profile is illustrated by the right-hand screw profile. The two screw profiles consist of 16 circular arcs. The circular arcs of the generating and generated screw profile are distinguished by thick, continuous lines, which are provided with the respective numbers of the circular arcs. The center points of the circular arcs are illustrated by small circles. The center points of the circular arcs are connected by thin, continuous lines both with the starting point and with the end point of the associated circular arc (defining lines). The outer screw radius is in each case of equal magnitude for the generating and the generated screw profile. In the region of the screw barrel the outer screw radius is distinguished by a thin dashed line, and in the intermesh zone by a thin dotted line. As a result of the plurality of circular arcs and as a result of the generation of figures using computer software, it may be that the numbers of individual circular arcs overlap with defining lines and are therefore not very legible. Despite the sometimes poor legibility of individual numbers, the structure of the profiles is nonetheless clear from the context in conjunction with this description and the coordinates given in FIG. 13b.

The pair of screw profiles used according to the invention and shown in FIG. 13a is point-symmetrical, but not axially symmetrical. The straight line FP (shown by a dotted line) has no tangent. Such a screw element allows particularly significant latitude for the dispersing action, since the regions upstream and downstream of the tips, which are crucial to the dispersing action, may be precisely adapted to the task, without the need to take account of the geometric restriction due to the straight line FP. FIG. 13b shows for all the circular arcs of FIG. 13a the x and y coordinates (Mx and My) of the center points, the radii R and the angles α of the circular arcs. The angles are stated in radians; all other dimensional indications are normalized to the centerline distance and are therefore dimensionless.

Plastic compositions which may be extruded highly efficiently according to the invention while gentle treatment of the product is simultaneously ensured, are for example suspensions, pastes, glass, ceramic compositions, metals in the form of a melt, plastics, plastics melts, polymer solutions, elastomer and rubber compositions.

Plastics and polymer solutions are preferably used, particularly preferably thermoplastic polymers. Preferred thermoplastic polymers are preferably at least one of the series of polycarbonate, polyamide, polyester, in particular polybutylene terephthalate and polyethylene terephthalate, polylactides, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl) methacrylate, polyphenylene oxide, polyphenylene sulfide, polyether ketone, polyarylether ketone, styrene polymers, in particular polystyrene, styrene copolymers, in particular styrene-acrylonitrile copolymer, acrylonitrile-butadiene-styrene block copolymers and polyvinyl chloride. Blends of the listed plastics are likewise preferably used, these being understood by a person skilled in the art to be a combination of two or more plastics. Particular preference is given to polycarbonate and mixtures containing polycarbonate, polycarbonate being very particularly preferred, it being obtained for example using the phase boundary method or the melt transesterification method.

Further preferred feed materials are rubbers. Preferred rubbers are preferably at least one from the series of styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta percha, acrylate rubber, fluororubber, silicone rubber, sulfide rubber, chlorosulfonyl-polyethylene rubber. A combination of two or more of the listed rubbers, or a combination of one or more rubbers with one or more plastics is of course also possible.

These thermoplastics and elastomers may be used in pure form or as mixtures with fillers and reinforcing materials, such as in particular glass fibers, as mixtures with one another or with other polymers or as mixtures with conventional polymer additives.

In one preferred embodiment the plastics compositions, in particular the polymer melts and mixtures of polymer melts, have additives admixed with them. These may be placed as solids, liquids or solutions in the extruder together with the polymer or at least some of the additives or all the additives are supplied to the extruder via a side stream.

Additives may impart many different characteristics to a polymer. They may for example [be] colorants, pigments, processing auxiliaries, fillers, antioxidants, reinforcing materials, UV absorbers and light stabilizers, metal deactivators, peroxide scavengers, basic stabilizers, nucleating agents, benzofurans and indolinones active as stabilizers or antioxidants, mold release agents, flame-retardant additives, antistatic agents, dye preparations and melt stabilizers. Examples of these are carbon black, glass fibers, clay, mica, graphite fibers, titanium dioxide, carbon fibers, carbon nanotubes, ionic liquids and natural fibers.

The advantages achieved when the method is used for various polymers vary depending on the type of extrusion process and the type of plastic composition.

When extruding polyethylene and polyethylene copolymers, an excessively high temperature results in an increase in molecular weight, branching and crosslinking. Polyethylene and polyethylene copolymers furthermore react with atmospheric oxygen in the autoxidation cycle known to a person skilled in the art ([2] Hepperle, J.: Schädigungsmechanismen bei Polymeren [Damage mechanisms in polymers], Polymeraufbereitung [Polymer compounding] 2002, VDI-K, VDI-Verlag GmbH, [3] Zweifel, H.: Stabilization of Polymeric Materials, Berlin, Springer 1997, Schwarzenbach, K. et al.: Antioxidants, in Zweifel, H. (ed.): Plastics Additives Handbook, Munich, Hanser 2001, [5] Cheng, H. N., Schilling, F. C., Bovey, F. A.: $^{13}C$ Nuclear Magnetic Resonance Observation of the Oxidation of Polyethylene, Macromolecules 9 (1976) p. 363-365) to form strong-smelling and thus disruptive low molecular weight components such as for example ketones, aldehydes, carboxylic acids and alcohols.

When extruding copolymers based on polyethylene and vinyl acetate, an excessively high temperature additionally results in the formation of strong-smelling and corrosive acetic acid.

When extruding polypropylene and polypropylene copolymers, a high temperature results in molecular weight degradation. Polypropylene and polypropylene copolymers furthermore react with atmospheric oxygen in the autoxidation cycle to feint strong-smelling and thus disruptive low molecular weight components such as for example ketones, aldehydes, carboxylic acids and alcohols.

When extruding polyvinyl chloride, an excessively high temperature results in polyvinyl chloride discoloration and the elimination of corrosive gaseous hydrochloric acid, wherein the hydrochloric acid in turn catalyses further elimination of hydrochloric acid.

When extruding polystyrene, an excessively high temperature results in the formation of harmful styrene as well as dimeric and trimeric styrene, with molecular weight degradation and corresponding impairment of mechanical properties.

When extruding polystyrene-acrylonitrile copolymer (SAN), the product turns a yellowish color on exposure to thermal stress, resulting in reduced transparency, and forms the carcinogenic monomer acrylonitrile as well as styrene, with molecular weight degradation and impairment of mechanical properties.

When extruding aromatic polycarbonates, the product turns a yellowish color on exposure to excessive thermal stress, in particular due to the action of oxygen, resulting in reduced transparency, and exhibits molecular weight degradation, in particular due to the action of water. Monomers such as for example bisphenol A are also dissociated on exposure to elevated temperature.

When extruding polyesters such as for example polyethylene terephthalate, polybutylene terephthalate, polytrimethylene terephthalate or polylactides, an excessive temperature and the action of water result in a reduction in molecular weight and displacement of the end groups in the molecule. This is problematic especially when recycling polyethylene terephthalate. Polyethylene terephthalate eliminates acetaldehyde at elevated temperature, which may for example result in changes to the flavor of the contents of beverage bottles.

When extruding thermoplastics impact-modified with diene rubbers, in particular with butadiene rubber, in particular impact-modified grades of polystyrene (HIPS) and impact-modified SAN (acrylonitrile-butadiene-styrene, ABS), an excessive temperature results in the elimination of carcinogenic butadiene and toxic vinylcyclohexene. Furthermore the diene rubber crosslinks, resulting in impaired mechanical properties of the product.

When extruding polyoxymethylene, an excessive temperature results in the elimination of toxic formaldehyde.

When extruding polyamides such as polyamide 6, polyamide 6,6, polyamide 4,6, polyamide 11 and polyamide 12, an excessively high temperature results in product discoloration and molecular weight degradation and in the reformation of monomers and dimers, so resulting in impairment of mechanical properties, especially in the presence of water.

When extruding thermoplastic polyurethanes, an excessively high temperature results in changes to the molecular structure by transurethanization and, in the presence of water, in molecular weight degradation. Both of these undesirably influence the properties of the thermoplastic polyurethane.

When extruding polymethyl methacrylate, methyl methacrylate is eliminated and molecular weight degraded on exposure to excessive thermal stress, resulting in an odor nuisance and impaired mechanical properties.

When extruding polyphenylene sulfide, an excessively high temperature results in the elimination of sulfur-containing organic and inorganic compounds, which result in an odor nuisance and may lead to corrosion of the extrusion dies. Low molecular weight oligomers and monomers are also formed and the molecular weight degraded, so impairing the mechanical properties of polyphenylene sulfide.

When extruding polyphenylsulfone, an excessively high temperature results in the elimination of organic compounds, especially in the presence of water. The molecular weight also declines, resulting in impaired mechanical properties.

When extruding polyphenylene ether, excessively high temperatures result in the elimination of low molecular weight organic compounds, wherein the molecular weight declines. This results in impairment of the mechanical properties of the product.

When extruding diene rubbers such as for example polybutadiene (BR), natural rubber (NR) and synthetic polyisoprene (IR), butyl rubber (IIR), chlorobutyl rubber (CIIR), bromobutyl rubber (BIIR), styrene-butadiene rubber (SBR), polychloroprene (CR), butadiene-acrylonitrile rubber (NBR), partially hydrogenated butadiene-acrylonitrile rubber (HNBR) and ethylene-propylene-diene copolymers (EPDM), an excessively high temperature results in gel formation by crosslinking, which leads to the impairment of mechanical properties of components produced therefrom. In the case of chloro- and bromobutyl rubber, an elevated temperature may result in the elimination of corrosive gaseous hydrochloric or hydrobromic acid, which in turn catalyzes further decomposition of the polymer.

When extruding rubber compounds which contain vulcanizing agents, such as for example sulfur or peroxides, excessively high temperatures result in premature vulcanization. This results in its no longer being possible to produce any products from these rubber compounds.

When extruding mixtures of one or more polymers at excessively high temperatures, the disadvantages of extruding the individual polymers occur in each case.

The subprocess of degassing polymers during production is carried out on "degassing extruders". Degassing extruders are known in principle to a person skilled in the art and described for example in [1]. "Degassing domes" are characteristic of degassing extruders. These are barrels with openings through which the vapors which arise can escape. As is known, different degassing domes may be operated at different pressures if product flow is restricted between the degassing domes, so creating a seal between the different pressures.

The screw elements used according to the invention are preferably used in partially filled zones and particularly preferably in the degassing zones.

A degassing extruder used according to the invention may be fed with product in various ways depending on the form assumed by the polymer. In a preferred variant, the extruder is fed with a liquid phase which, in addition to the polymer, may still contain solvent and optionally residual monomers. The form in which polymers are obtained after the reaction and optionally preliminary evaporation is known to a person skilled in the art. Examples are:

polystyrene with residual styrene and possibly ethylbenzene, toluene, xylene, butanone or another solvent styrene and acrylonitrile copolymer with residual styrene, residual acrylonitrile, and possibly ethylbenzene, toluene, xylene, butanone or another solvent linear low or high density polyethylene, branched polyethylene with solvents such as hexane, technical hexane, propane, isobutane and monomers such as propylene, butene-1, hexene-1, 4-methylpentene-1, octene-1 (processes involving suspensions are: CX process, Mitsui Chemicals (hexane), Hostalen process Basell (hexane), Chevron Philips USA (isobutane), Borstar process, Borealis (propane) Belgium, and DSM uses hexane in a solvent process). Details in this connection are described in [6] (Comparative Analysis of Various Polyethylene Production Technologies, Chem. & Petroleum Eng. vol. 44, nos. 7-8, 2008)

polycarbonate with solvent, for example chlorobenzene and methylene chloride polymethyl methacrylate with monomer, i.e. methyl methacrylate In a preferred variant, the product is supplied to a liquid fed degassing extruder with "backward" degassing. In this case, an optionally preheated polymer solution is introduced into a twin-screw extruder, where it foams. The gases are then discharged backwards through the flights of the twin-screw extruder to a degassing dome. Such a backward degassing is in general prior art and described, for example, in [1] on pages 193-195. In this case, on input into the extruder the concentration of polycarbonate in the solution preferably amounts to between 55 mass % and 95 mass %, particularly preferably between 65 mass % and 90 mass %.

A further preferred variant for supplying product to a liquid fed degassing extruder involves flash evaporation at the extruder inlet. Flashing preferably proceeds directly above the extruder, such that the partially degassed melt falls directly onto the screws. The vapors arising from flashing are preferably drawn off from a separating vessel, which is likewise located above the extruder, by means of one or more vapor lines. The temperature of the polymer solution is preferably in the range from 180° C. to 300° C., particularly preferably between 200° C. and 250° C. Flashing is preferably operated in a pressure range between 0.3 bar abs and 6 bar abs, particularly preferably between 0.5 bar abs and 2 bar abs.

A further preferred variant for supplying product to a liquid-fed degassing extruder involves a shell-&-tube heat exchanger at the extruder inlet, which heat exchanger is arranged above the screws of the extruder, such that partially degassed polymer solution emerging from the tubes can fall directly onto the screws. A separating vessel, in which the vapors and polymer solution are separated from one another and which has at least one vapor outlet, is additionally located between the outlet of the shell-&-tube heat exchanger and the extruder screws. The polymer solution is introduced through an inlet opening at the upper end of the falling tube evaporator and supplied via a distributor plate to a plurality of tubes which are externally heated. Heating is preferably provided by condensing steam, a condensing organic heat-transfer medium or a liquid organic heat-transfer medium. The thermal energy for evaporating solvent is introduced into the polycarbonate melt via the internal surface of the tubes. Solvent fractions evaporate as a result, resulting in the formation of a biphasic gas-liquid mixture. Overheating of the polymer melt is thus purposefully avoided. The escaping solvent in vapor form brings about constant thorough mixing and surface renewal of the polymer melt, so ensuring more efficient concentration thereof.

In this way, a distinctly more highly concentrated polycarbonate melt is supplied to the devolatilizing extruder, such that the same or even higher residual degassing of the polycarbonate melt may be achieved not only with a lower energy input but also a shorter residence time of the polycarbonate melt in the extruder. On input into the shell-&-tube heat exchanger, the concentration of the polymer solution is preferably between 50 and 80 wt. %. The tube heating temperature amounts to 240° C. to 360° C., preferably 250° C. to 340° C. and very particularly preferably 260° C. to 300° C. The polymer concentration on input into the extruder amounts to between 80 and 99 wt. %, preferably 90 to 99 wt. %. The pressure in the separating vessel preferably amounts to between 0.3 bar abs and 6 bar abs, particularly preferably between 0.5 bar abs and 2 bar abs.

A further preferred way of feeding a liquid-fed degassing extruder with product involves a foam evaporator, as is for example described for polycarbonate in EP 1 740 638. A foam evaporator may consist, for example, of a shell-&-tube assembly or a die plate. The polymer melt foams on emerging from the orifices of the foam evaporator and residual solvent is removed down to low residual contents.

This foam evaporator is preferably arranged above the screws of the extruder such that the polymer solution emerging from the tubes can fall directly onto the screws. A separating vessel, in which the vapors and polymer solution are separated from one another and which has at least one vapor outlet, is additionally located between the outlet of the shell-&-tube heat exchanger and the extruder screws.

A polycarbonate solution is particularly preferably used as the polymer solution.

In this case, the concentration of the polycarbonate solution on input into the foam evaporator amounts to between 90 wt. % and 99.95 wt. %. A foaming agent such as for example nitrogen, CO2 is optionally added to the polycarbonate solution. The vapor pressure of the foaming agent together with the residual solvent amounts to 0.1 to 100 bar, preferably 0.5 to 60 bar and particularly preferably 1 to 40 bar. The pressure in the separator amounts to The polymer solution is divided into sub-streams of between 0.1 and 20 mbar through the orifices of the foam evaporator. The temperature of the polymer solution amounts to between 250° C. and 340° C. The pressure in the separating vessel preferably amounts to between 0.1 and 20 mbar.

FIG. 14 shows a preferred embodiment, in which the screw elements are used in a degassing extruder. In zone A, the polycarbonate solution is introduced into the extruder through a flash-evaporation tube 1. In the degassing vessel 2, the vapors are separated from the polycarbonate solution. Zones C, E, G, J and L are degassing zones. The vapors released therein are drawn off in the degassing domes 3. Zones B, D, F and H are restricted flow zones, in which a flow restricting element produces a plug of product which makes it possible to establish different pressures in respective neighboring zones. Entraining agent is additionally added in zone K to make degassing more effective in zone L. In zone M, the polymer is mixed with a side stream containing additives and pressure is built up for the filtration and die which follow the extruder.

FIG. 15 shows a further preferred embodiment in which the screw elements are used in a degassing extruder. in zone A, the polycarbonate solution is introduced into the extruder through a vertical preheater 1. In the degassing vessel 2, the vapors are separated from the polycarbonate solution. Zones C, E, G, J and L are degassing zones. The vapors released therein are drawn off in the degassing domes 3. Zones B, D, F and H are restricted flow zones, in which a flow restricting element produces a plug of product which makes it possible to establish different pressures in respective neighboring zones. Entraining agent is additionally added in zone K to make degassing more effective in zone L. In zone M, the polymer is mixed with a side stream containing additives and pressure is built up for the filtration and die which follow the extruder.

Figure 16:
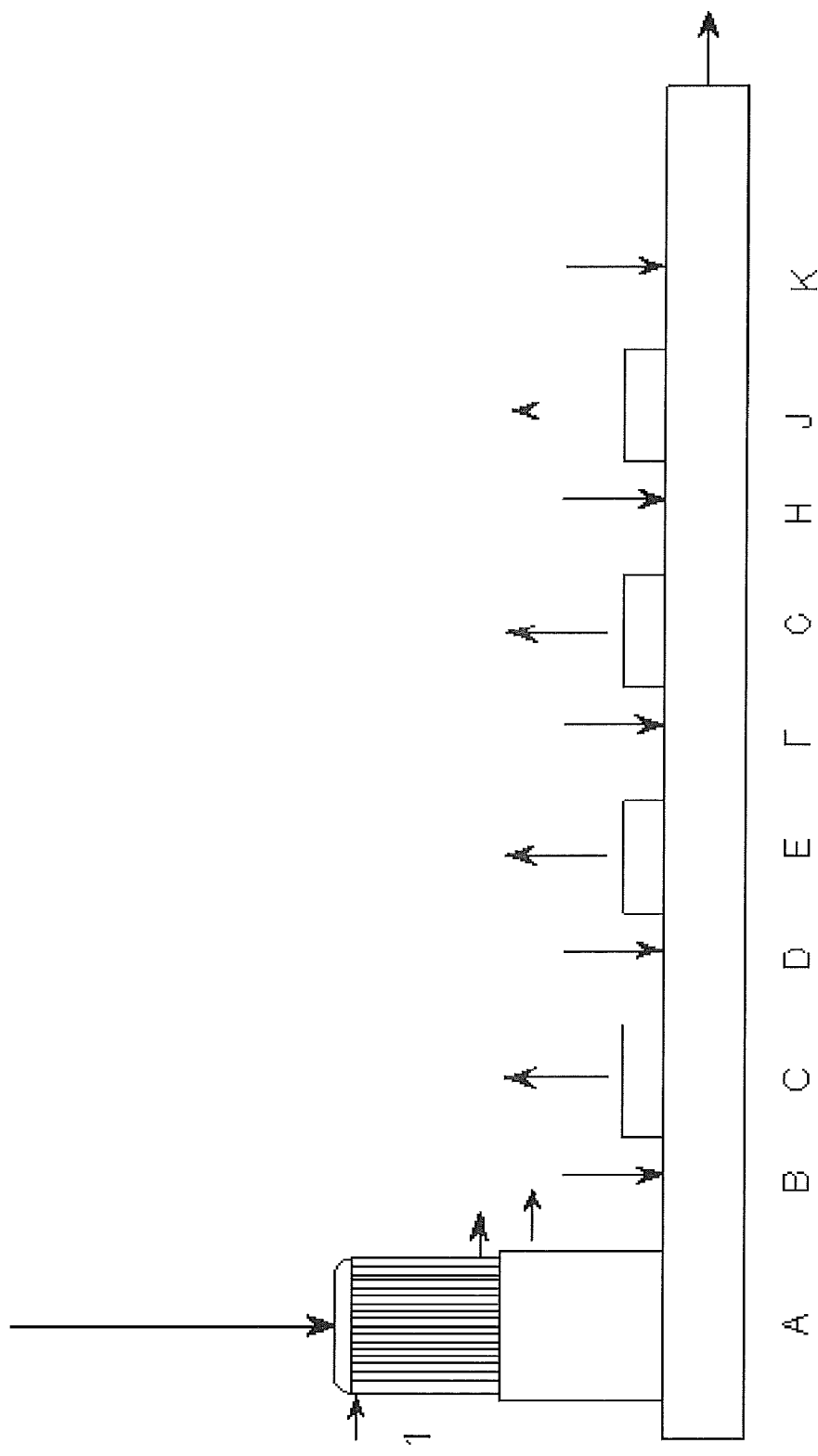
FIG. 16 illustrates a non-limiting example of screw elements in a degassing extruder with a foam evaporator at the inlet according to the present disclosure.

FIG. 16 shows a further preferred embodiment in which the screw elements are used in a degassing extruder with a foam evaporator at the inlet. In zone A, the polycarbonate solution is introduced into the extruder through a foam evaporator 1. In the separator 2, the vapors are separated from the polycarbonate solution. In zones B, D, F and H, entraining agent is in each case introduced and dispersed. In zones C, E. F, G and J, the volatile constituents are separated from the polymer. In zone K, the polymer is mixed with a side stream containing additives and optionally further polymer and pressure is built up for the filtration and die which follow the extruder.

A twin- or multi-screw extruder fitted with the screw elements may also be fed with particles during polymer production. In this case, an extruder according to the invention above all serves for melting, for conversion and for mixing with additives. The form in which the polymers are obtained after the reaction and optionally preliminary evaporation or precipitation is known to a person skilled in the art. Examples are:

polypropylene, in which the polymer is obtained in the form of powder after the final reaction high density polyethylene from a gas phase or slurry process emulsion polymers such as for example acrylonitrile-butadiene-styrene after precipitation and optionally drying During compounding, a twin- or multi-screw extruder which is fitted with the screw elements is particularly suitable for tasks involving degassing. Particular advantages are here achieved during direct compounding of recycled polyethylene terephthalate from bottle material, which comprises degassing with minimal exposure to thermal stress.

The process according to the invention is particularly preferably used in the production and compounding of polycarbonate. It has advantages here above all with regard to the color of the polycarbonate, which, in uncolored polycarbonate, is measured with the yellowness index (VI). The screw elements used according to the invention are here particularly preferably used in the degassing zone.

Diphenols suitable for the process according to the invention for producing polycarbonate have often been described in the prior art.

Suitable diphenols are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis (hydroxyphenyl) sulfones, bis(hydroxyphenyl) sulfoxides, α,α'-bis-(hydroxyphenyl)-diisopropylbenzenes, and the alkylated, ring-alkylated and ring-halogenated compounds thereof.

Preferred diphenols are 4,4'-dihydroxydiphenyl, 2,2-bis-(4-hydroxyphenyl)-1-phenylpropane, 1,1-bis-(4-hydroxyphenyl)-phenylethane, 2,2-bis-(4-hydroxyphenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)-phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

In the case of homopolycarbonates, only one diphenol is used, while in the case of copolycarbonates two or more diphenols are used, wherein the diphenols used, like all the other chemicals and auxiliaries added to the synthesis, may obviously be contaminated with impurities originating from the synthesis, handling and storage thereof, although it is desirable to use the cleanest possible raw materials.

The monofunctional chain terminators required to control molecular weight, such as for example phenol or alkylphenols, in particular phenol, p-tert.-butylphenol, iso-octylphenol, cumylphenol, the chloroformic acid esters thereof or acid chlorides of monocarboxylic acids or mixtures of these chain terminators, are either introduced into the reaction with the bisphenolate or bisphenolates or alternatively added at any desired time during synthesis, providing that phosgene or chloroformic acid end groups are present in the reaction mixture or, in the case of acid chlorides and chloroformic acid esters as chain terminators, providing that sufficient phenolic end groups of the polymer being formed are available. Preferably, however, the chain terminator(s) are added after phosgenation at a location or time at which no phosgene is any longer present, but the catalyst has not yet been apportioned. Alternatively, they may also be apportioned before the catalyst, together with the catalyst or in parallel.

Branching agents or branching agent mixtures are optionally added to the synthesis in the same manner. Conventionally, however, branching agents are added before the chain terminators. As a rule trisphenols, quaterphenols or acid chlorides of tri- or tetracarboxylic acids or mixtures of the polyphenols or acid chlorides are used. Some of the compounds suitable as branching agents with three or more than three phenolic hydroxyl groups are for example phloroglucinol, 4,6-dimethyl-2, 4,6-tri-(4-hydroxyphenyl)-heptene-2,4,6-dimethyl-2,4,6-tri-(4-hydroxyphenyl)-heptane, 1,3,5-tri-(4-hydroxyphenyl)benzene, 1,1,1-tri(4-hydroxyphenyl)ethane, tri-(4-hydroxyphenyl)phenyl-methane, 2,2-bis(4,4-bis(4-hydroxyphenyl)cyclohcxyl)propane, 2,4-bis-(4-hydroxyphenyliso-propyl)phenol, tetra-(4-hydroxyphenyl)methane.

Some other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydro and 1,1,1-tri-(4-hydroxyphenyl)ethane.

The catalysts preferably used in the phase boundary synthesis of polycarbonate are tertiary amines, in particular triethylamine, tributylamine, trioctylamine, N-ethylpiperidine, N-methylpiperidine, N-i/n-propylpiperidine, quaternary ammonium salts such as tetrabutylammonium, tributylbenzylammonium, tetraethylammonium hydroxide, chloride, bromide, hydrogensulfate, tetrafluoroborate, and the phosphonium compounds corresponding to the ammonium compounds. These compounds are described in the literature as typical phase boundary catalysts, are commercially obtainable and are familiar to a person skilled in the art. The catalysts may be added to the synthesis individually, as a mixture or also in parallel and in succession, optionally also before phosgenation, but they are preferably apportioned after introduction of phosgene, unless an onium compound or a mixture of onium compounds are used as catalysts. In this case, addition preferably proceeds before the phosgene is apportioned. The catalyst or catalysts may be apportioned without solvent, in an inert solvent, preferably the polycarbonate synthesis solvent, or also as an aqueous solution, in the case of tert.-arnines then as the ammonium salts thereof with acids, preferably mineral acids, in particular hydrochloric acid. When a plurality of catalysts are used or the total amount of catalyst is apportioned in proportions, different methods of apportionment may of course be used at different points or at different times. The total quantity of catalysts used amounts to 0.001 to 10 mol % relative to introduced moles of bisphenols, preferably 0.01 to 8 mol %, particularly preferably 0.05 to 5 mol %.

Polycarbonate synthesis may be carried out continuously or discontinuously. The reaction may therefore proceed in stirred-tank reactors, tubular reactors, pumped circulation reactors or cascades of stirred-tank reactors or combinations thereof. It must here be ensured by using the abovementioned mixing elements that aqueous and organic phases as far as possible do not segregate until the synthesis mixture has reacted to completion, i.e. it no longer contains any saponifiable chlorine of phosgene or chloroformic acid esters.

After introduction of the phosgene, it may be advantageous to mix the organic phase and the aqueous phase thoroughly for a certain time, before optionally adding branching agent, if the latter has not been apportioned together with the bisphenolate, chain terminator and catalyst. Such a post-reaction time may be advantageous after each apportionment. These post-stirring times amount to 10 seconds to 60 minutes, preferably 30 seconds to 40 minutes, particularly preferably 1 to 15 minutes.

The organic phase may consist of one solvent or mixtures of a plurality of solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene and mixtures thereof. Aromatic hydrocarbons such as benzene, toluene, m/p/o-xylene or aromatic ethers such as anisole may, however, also be used alone, as a mixture with or in addition to chlorinated hydrocarbons. Another embodiment of the synthesis uses solvents which do not dissolve polycarbonate, but instead only cause it to swell. It is therefore also possible to use nonsolvents for polycarbonate in combination with solvents. Solvents such as tetrahydrofuran, 1,3/1,4-dioxane or 1,3- dioxolane soluble in the aqueous phase may here also be used as the solvents, if the solvent partner forms the second organic phase.

The at least biphasic reaction mixture, which has reacted to completion and still contains at most traces (<2 ppm) of chloroformic acid esters, is left to stand for phase separation. The aqueous alkaline phase may possibly be entirely or partially returned to the polycarbonate synthesis as the aqueous phase or alternatively sent for wastewater treatment in which the solvent and catalyst fractions are separated and recirculated. In another variant of working up, once the organic impurities, in particular solvents and polymer residues, have been separated out and optionally after a specific pH value has been established, for example by addition of sodium hydroxide, the salt is separated, which can for example be sent to chlor-alkali electrolysis, while the aqueous phase is optionally returned to the synthesis.

The organic phase containing the polycarbonate may now be purified of any contaminants of an alkaline, ionic or catalytic nature. Even after one or more settling operations, the organic phase still contains proportions of the aqueous alkaline phase in fine droplets and the catalyst, as a rule a tert.-amine. The settling operations may optionally be assisted by the organic phase passing through settling tanks, stirred-tank reactors, coalescers or separators or combinations thereof, wherein water may optionally be apportioned in each or individual separation steps, under certain circumstances using active or passive mixing elements.

After this coarse separation of the alkaline, aqueous phase, the organic phase is washed once or more with dilute acids, mineral acids, carboxylic, hydroxycarboxylic and/or sulfonic acids. Aqueous mineral acids are preferred, in particular hydrochloric acid, phosphorous acid and phosphoric acid or mixtures of these acids. The concentration of these acids should be in the range from 0.001 to 50 wt. %, preferably from 0.01 to 5 wt. %.

The organic phase is furthermore repeatedly washed with deionized or distilled water. Separation of the organic phase, optionally dispersed with proportions of the aqueous phase, after the individual washing steps proceeds by means of settling tanks, stirred-tank reactors, coalescers or separators or combinations thereof, wherein the washing water may be apportioned between the washing steps optionally using active or passive mixing elements.

Between these washing steps or also after washing, acids may optionally be added, preferably dissolved in solvent on which the polymer solution is based. Gaseous hydrogen chloride and phosphoric acid or phosphorous acid, which may optionally also be used as mixtures, are preferably used here.

Properties of the plastic compositions obtained by the process according to the invention may be modified with conventional additives and additional substances (e.g. auxiliaries and reinforcing materials). The purpose of adding additives and added substances is to extend service life (for example hydrolysis or degradation stabilizers), to improve color stability (for example heat and UV stabilizers), to simplify processing (for example mold release agents, flow auxiliaries), to improve service characteristics (for example antistatic agents), to improve flame retardancy, to influence visual appearance (for example organic colorants, pigments) or to adapt polymer properties to specific stresses (impact modifiers, finely divided minerals, fibrous materials, silica flour, glass fibers and carbon fibers).

The following examples serve to illustrate the invention by way of example and should not be regarded as restricting.

The pressure build-up capacity, power requirement and maximum increase in temperature of screw elements with a double-flighted Erdmenger screw profile according to the prior art and of screw elements used according to the invention with novel screw profiles were calculated with the assistance of flow simulation.

As is known to a person skilled in the art and as is to be found in [1] on pages 129 to 146, the operating behavior of screw elements such as conveying, kneading and mixing elements may be described by a pressure differential-throughput and a power-throughput characteristic. To simplify transferability to different extruder sizes, the variables pressure differential, power and throughput often are used in their dimensionless forms. In the case of a plastic composition with Newtonian flow behavior there is a linear relationship both between pressure differential and throughput and between power and throughput. In the pressure differential-throughput characteristic, the intersection points of the axes are labelled A1 and A2 ([1], page 133). The operating point A1 denotes the inherent throughput of a screw element. The operating point A2 denotes the pressure build-up capacity without throughput. In the power-throughput characteristic the intersection points of the axes are labelled B1 and B2 ([1], page 136). Point B1 is the "turbine point". If the throughput is greater than B1, power is output to the screws. Operating point B2 denotes the power requirement without throughput.

In a pressure build-up zone only some of the power introduced may be converted into flow power. The remainder of the introduced power dissipates. Flow power is calculated as the product of throughput and pressure differential. As a person skilled in the art will readily recognize, the flow power at the intersection points A1 and A2 of the axes is in each case equal to 0, since either the pressure differential is equal to 0 (A1) or the throughput is equal to 0 (A2). In the zone between A1 and A2 both the pressure differential and the throughput are greater than 0, resulting in a positive flow power. If the flow power of an operating point provided by a throughput is divided by the power output by the screws at this operating point, the pressure build-up efficiency at this operating point is obtained. By deriving efficiency on the basis of throughput and subsequent root finding, the maximum efficiency of a screw element may be found.

The flow inside a pair of screw elements was calculated for the pressure build-up capacity and the power requirement using the commercially available software package Fluent, version 6.3.26, and for the maximum increase in temperature using the open source software toolkit Open-FOAM, version 1.5. An introduction to flow simulation of twin-screw extruders may be found for example in [1], pages 147-168.

Flow simulation was carried out in each case by investigating using screw elements whose length is equal to half the pitch. During flow simulation, these screw elements were provided at their axial start and their axial end with periodic constraints, in order to calculate a hydrodynamically established flow state.

A fluid with Newtonian flow behavior was used as the plastic composition. The material data used were typical values, as may for example be obtained from the book Polymeraufbereitung [Polymer compounding] 2002, VDI-K, VDI-Verlag, Düsselderf, 2002 on page 159. The density of the plastic composition amounts to 1000 kg/m$^3$. The viscosity of the plastic composition amounts to 1000 Pa·s. The thermal conductivity of the plastic composition amounts to 0.2 W/m/K. The thermal capacity of the plastic composition amounts to 2000 J/kg/K.

EXAMPLES

Comparative Example 1

Figure 17A:
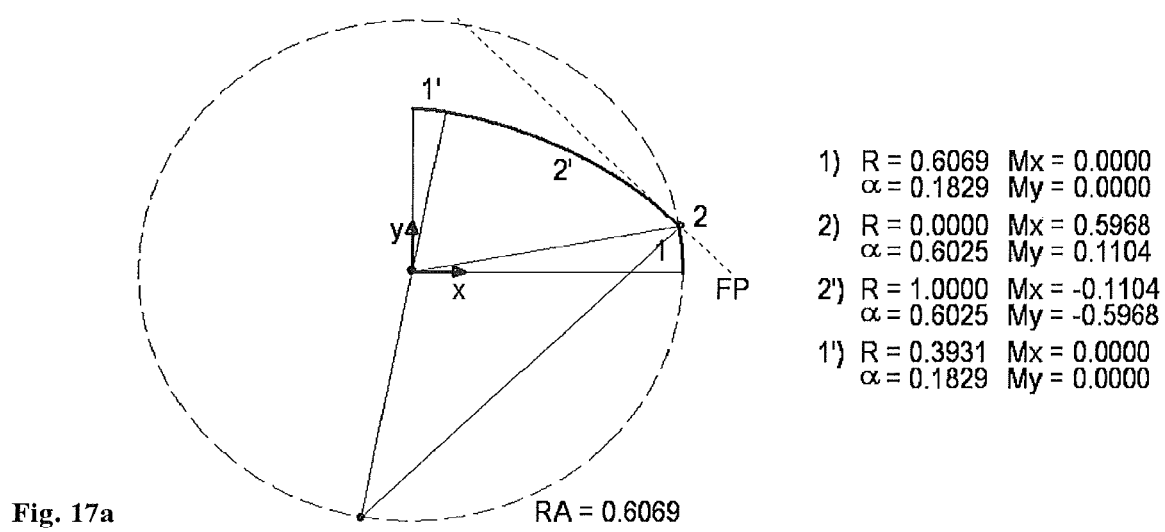
FIG. 17a illustrates a cross-section of a quarter of a screw profile of a screw element with an Erdmenger screw profile according to the prior art.
Figure 17B:
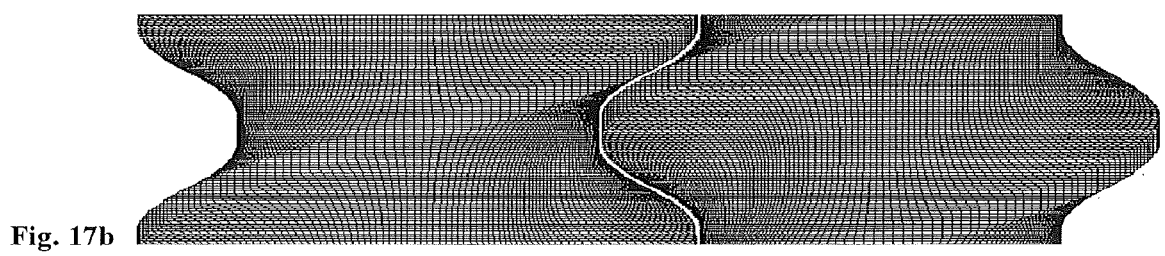
Figure 17C:
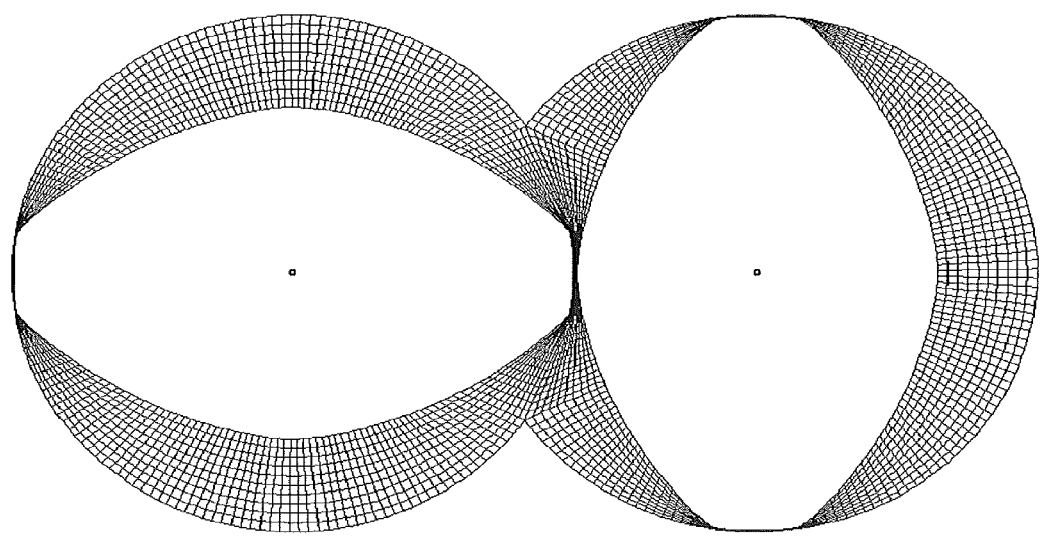
FIG. 17c illustrates a plan view of the pair of screw elements according to FIG. 17b.

The geometry of the conveying element according to the prior art may be inferred from FIGS. 17a to 17c.

FIG. 17a shows in cross-section a quarter of a screw profile of a screw element with an Erdmenger screw profile according to the prior art. In the middle of the figure is located the xy system of coordinates, at the origin of which is located the point of rotation of the screw profile. The circular arcs of the screw profile are distinguished by thick, continuous lines, which are provided with the respective numbers of the circular arcs. The center points of the circular arcs are illustrated by small circles. The center points of the circular arcs are connected by thin, continuous lines both with the starting point and with the end point of the associated circular arc. The straight line FP is illustrated by a thin, dotted line. The dimensionless outer screw radius RA is distinguished by a thin, dashed line, the numerical value of which is indicated bottom right in the figure to four significant digits. On the right next to the figure the radius R, the angle $\alpha$ and the x and y coordinates of the circular arc center point Mx and My are stated for each circular arc in each case to four significant digits. These details unambiguously define the screw profile. The screw profile is mirror-symmetrical relative to the x and y axes, such that the entire screw profile is obtained by mirroring of the illustrated quarter at the x and y axes.

Screw profiles in which a quarter of the screw profile consists of a total of n circular arcs are described below as n-circle screw profiles.

In FIG. 17a, the circular arcs on an n-circle screw profile are numbered in that the first n/2 circular arcs are numbered consecutively in ascending order 1 to n/2 and the last n/2 circular arcs are numbered consecutively in descending order (n/2)' to 1'. The circular arc n/2 and the circular arc (n/2)' each touch the straight line FP, Each circular arc i of the screw profile corresponds to a circular arc i' of the screw profile. The radius of a circular arc i' is calculated from the difference of the centerline distance minus the radius of the circular arc i, thus $R\_i'=A-R\_i$. The angle of a circular arc i' is equal to the angle of a circular are i, thus $\alpha\_i'=\alpha\_i$. This means that a tip zone with a circular arc j is equal to a grooved zone with a circular arc j'. This further means that a grooved zone with a circular arc j is equal to a tip zone with a circular arc j'.

FIG. 17a shows a quarter of a double-flighted Erdmenger screw profile according to the prior art, which is made up of 4 circular arcs. It is characteristic of Erdmenger screw profiles that the radius $R\_1=RA$, the radius $R\_2=0$, the radius $R\_2'=A=1$ and the radius $R\_1'=A-RA=R1$. The angles $\alpha\_1$, $\alpha\_2$, $\alpha\_2'$ and $\alpha\_1'$ depend on the outer screw radius and on the centerline distance. The angle $\alpha\_1$ is equal to the half tip angle of a double-flighted Erdmenger screw profile. The Erdmenger screw profile comprises a kink at the location of the radius $R\_2$. The "magnitude of the kink" is determined by the angle $\alpha\_2$, i.e. the transition from the circular arc 1 to the circular arc 2' is brought about by rotation about the angle $\alpha\_2$.

In FIG. 17a, the dimensionless outer screw radius RA amounts to 0.6069. The half tip angle is $\alpha\_1=0.1829$.

FIG. 17b shows a pair of screw elements, configured as conveying elements, whose screw profile is based on FIG. 17a. The centerline distance of the two conveying elements amounts dimensionally to a=26.2 mm and dimensionlessly to A=a/a=1. The clearance between the two conveying elements amounts dimensionally to s=0.2 mm and dimensionlessly to S=s/a 0.0076. The clearance between the two conveying elements and the barrel amounts dimensionally to d=0.1 mm and dimensionlessly to D=d/a=0.0038. The pitch of the conveying elements amounts dimensionally to t=28.0 mm and dimensionlessly to T=t/a=1.0687. The length of the conveying elements amounts dimensionally to l=14.0 mm and dimensionlessly to L=l/a=0.5344, which corresponds to rotation of the screw profiles by an angle of $\pi$. The barrel is illustrated by thin, continuous lines to the left and right of the two conveying elements. The barrel diameter amounts dimensionally to dg=31.8 mm and dimensionlessly to DG=dg/a=2*RA=1.2137. A possible computational grid is further illustrated on the surfaces of the two conveying elements, which grid may be used for calculating flow in twin- and multi-screw extruders. The number of grid elements is equal to 180 in the circumferential direction and equal to 90 in the axial direction.

FIG. 17c shows a plan view of the pair of screw elements according to FIG. 17b. The free volume between the conveying elements and the barrel is provided with a possible computational grid, which may be used for calculating flow in twin- and multi-screw extruders. The number of grid elements is equal to 180 in the circumferential direction and equal to 10 in the radial direction. The axes of rotation of the two screw elements are labelled by small circles.

In contrast to the computational grids shown in FIGS. 17b and 17c, the pressure differential-throughput characteristic and the power-throughput characteristic were calculated using a computational grid comprising 320 grid elements in the circumferential direction, 160 grid elements in the axial direction and 12 grid elements in the radial direction. The intercepts of the pressure differential-throughput characteristic were calculated as follows: A1=0.263 and A2=4250. The intercepts of the power-throughput characteristic were calculated as follows: B1=1.033, B2=4390. Maximum efficiency during pressure build-up is determined as 7.32%.

The computational grid according to FIGS. 17b and 17c was used to calculate the maximum increase in temperature. The velocity and pressure field was initialized with a zero vector. The pressure gradient along the axes of rotation was set at 0, such that the inherent throughput A1 is established as the throughput. The temperature field was initialized at 300° C. Both the barrel wall and the surface of the two conveying elements were assumed to be adiabatic. The development of the temperature field was monitored over two revolutions of the extruder. The time step size was 0.000925926s. The rotational speed of the twin-screw extruder was 360 rpm.

The maximum temperature in the computation range was reached after two revolutions. The maximum temperature is at a virtually identical level on the surfaces of the two conveying elements, specifically in the tip zones which are just cleaning the barrel. According to calculation, the maximum temperature amounts to approx. 400° C.

Example 2

Figure 18A:
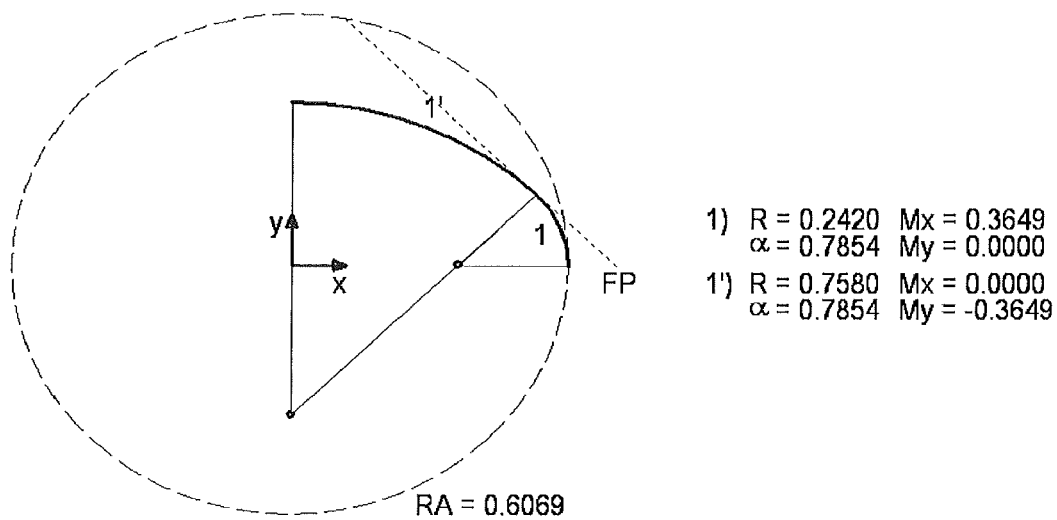
FIG. 18a illustrates a non-limiting example of a cross-section of a quarter of a screw profile of a screw element according to the present disclosure.
Figure 18B:
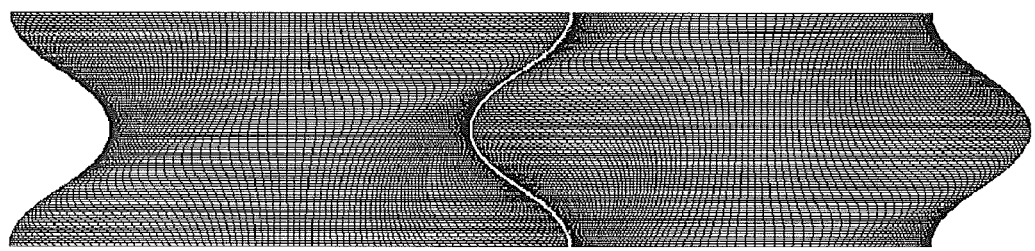
FIG. 18b illustrates a non-limiting example of a pair of screw elements, configured as conveying elements, whose screw profile is based on FIG. 18a according to the present disclosure.
Figure 18C:
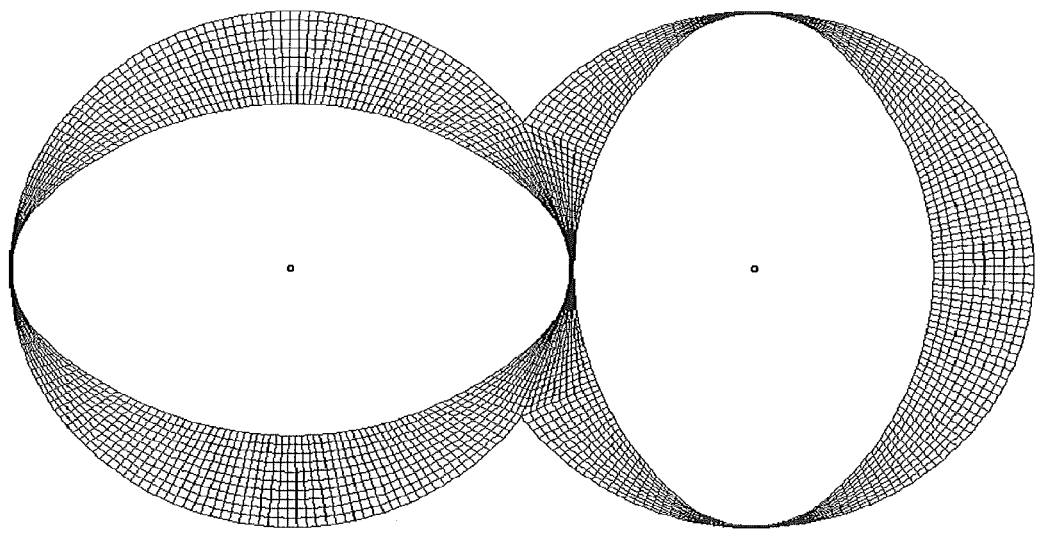
FIG. 18c illustrates a non-limiting example of a plan view of the pair of screw elements according to FIG. 18b.

The geometry of a conveying element used according to the invention may be inferred from FIGS. 18a to 18c.

FIG. 18a shows in cross-section a quarter of a screw profile of a screw element used according to the invention. The structure of the figure is similar to FIG. 17a, where it has already been described in detail. In FIG. 18a, the quarter of the screw profile consists of 2 circular arcs. It is furthermore characteristic of this screw profile that the screw profile does not contain a kink and that the tip angle of the tip zone, thus of a zone which lies on the outer screw radius, is equal to 0. The dimensionless outer screw radius amounts to RA=0.6069.

FIG. 18b shows a pair of screw elements, configured as conveying elements, whose screw profile is based on FIG. 18a. The centerline distance of the two conveying elements amounts dimensionally to a=26.2 mm and dimensionlessly to A=a/a=1. The clearance between the two conveying elements amounts dimensionally to s=0.2 mm and dimensionlessly to S=s/a=0.0076.

The clearance between the two conveying elements and the barrel amounts dimensionally to d=0.1 mm and dimensionlessly to D=d/a0.0038. The pitch of the conveying elements amounts dimensionally to t=28.0 mm and dimensionlessly to T=t/a=1.0687. The length of the conveying elements amounts dimensionally to l=14.0 mm and dimensionlessly to L=l/a=0.5344, which corresponds to rotation of the screw profiles by an angle of π. The barrel is illustrated by thin, continuous lines to the left and right of the two conveying elements. The barrel diameter amounts dimensionally to dg=31.8 mm and dimensionlessly to DG=dg/a=2*RA=1.2137. A possible computational grid is further illustrated on the surfaces of the two conveying elements, which grid may be used for calculating flow in twin- and multi-screw extruders. The number of grid elements is equal to 180 in the circumferential direction and equal to 90 in the axial direction.

FIG. 18c shows a plan view of the pair of screw elements according to FIG. 18b. The free volume between the conveying elements and the barrel is provided with a possible computational grid, which may be used for calculating flow in twin- and multi-screw extruders. The number of grid elements is equal to 180 in the circumferential direction and equal to 10 in the radial direction. The axes of rotation of the two screw elements are labelled by small circles.

In contrast to the computational grids shown in FIGS. 18b and 18c, the pressure differential-throughput characteristic and the power-throughput characteristic were calculated using a computational grid comprising 320 grid elements in the circumferential direction, 160 grid elements in the axial direction and 12 grid elements in the radial direction. The intercepts of the pressure differential-throughput characteristic were calculated as follows: A1=0.245 and A2=4530. The intercepts of the power-throughput characteristic were calculated as follows: B1=0.803, B2=3640. Maximum efficiency during pressure build-up is determined as 9.05%.

It is surprisingly found that, despite the minimized tip zones, which are merely linear in three dimensions, the pressure build-up capacity of the conveying element used according to the invention is only approx. 6.6% greater than in the case of a conveying element with a double-flighted Erdmenger screw profile according to the prior art from Example 1. By means of a conveying element used according to the invention, it is therefore possible to bring about a desired or necessary pressure build-up in a shorter pressure build-up zone, whereby the extruder structure is either shortened or, at a constant extruder length, other processing zones, such as for example a degassing zone or a mixing zone, are lengthened, so enhancing their action on the plastic composition.

It is additionally found that the power parameter B2 in the conveying element used according to the invention is approx. 17% lower than in a conveying element with a double-flighted Erdmenger screw profile according to the prior art from Example 1. A lower energy input reduces the increase in temperature and, as a consequence, also unwanted polymer damage.

The computational grid according to FIGS. 17b and 17c was used to calculate the maximum increase in temperature. The velocity and pressure field was initialized with a zero vector. The pressure gradient along the axes of rotation was set at 0, such that the inherent throughput A1 is established as the throughput. The temperature field was initialized at 300° C. Both the barrel wall and the surface of the two conveying elements were assumed to be adiabatic. The development of the temperature field was monitored over two revolutions of the extruder. The time step size was 0.000925926 s. The rotational speed of the twin-screw extruder was 360 rpm.

The maximum temperature in the computation range was sought after two revolutions. The maximum temperature is at a virtually identical level on the surfaces of the two conveying elements, specifically on a surface just beside the minimized tip zones, which are located just in the intermesh zone, thus in the zone in which the two barrel bores mutually interpenetrate. According to calculations, the maximum temperature amounts to approx. 365° C. According to calculations, the maximum surface temperature on minimized tip zones which just clean the barrel amounts to approx. 340° C.

In comparison with the conveying element according to the prior art from Example 1, an approx. 35° C. lower peak temperature is achieved with the conveying element from Example 2 used according to the invention. In relation to the tip zones, a temperature differential of as much as approx. 60° C. is found. Working on the assumption that the reaction rate constant of a polymer damaging reaction doubles per 10° C. increase in temperature, polymer damage occurs approx. 50 times faster in the zone of the screw tips of the conveying element according to Example 1 than in the zone of the screw tips of the conveying element according to Example 2.

What is claimed is:

1. A process for extruding plastic compositions comprising:
   I providing a multi-screw extruder with screw elements; and
   II conveying, kneading, mixing, degassing or compounding the plastic compositions in the multi-screw extruder using the screw elements;
   wherein the screw elements of the extruder are co-rotated in pairs;
   wherein at least one pair of these screw elements is fully self-wiping in pairs, and each screw element of the at least one pair of screw elements comprises two, three or four screw flights Z, Z is the number of flights of the screw elements;
   wherein at least one screw element of the at least one pair of screw elements being fully self-wiping in pairs and comprising two, three or four flights comprises a cross-section screw profile consisting of a constantly differentiable profile curve consisting of:
   eight, nine, ten or eleven circular arcs in case of a screw element comprising exactly two flights;
   twelve, thirteen, fourteen, fifteen, sixteen or seventeen circular arcs in case of a screw element comprising exactly three flights;
   sixteen, seventeen, eighteen, nineteen, twenty, twenty one, twenty two or twenty three circular arcs in case of a screw element comprising exactly four flights; and the circular arcs merging tangentially into one another at their start and end points;
wherein, in each sector of 360°/(2·Z), at least one screw profile, selected from a generating screw profile and a generated screw profile, comprises either two or three circular arcs;
wherein, in at least one sector of 360°/(2·Z), at least one screw profile, selected from a generating screw profile and a generated screw profile, comprises a first circular arc and a second circular arc, wherein:
a center point of the first circular arc is located on a line segment that extends from a center point of the second circular arc to a rightmost end point of the second circular arc;
both the first circular arc and the second circular arc share a common line segment that extends from the center point of the first circular arc to the rightmost end point of the second circular arc and a leftmost end point of the first circular arc;
a leftmost end point of the second circular arc is located at a point that corresponds to an inner radius of a screw profile; and
a rightmost end point of the first circular arc is located at a point that corresponds to an outer radius of a screw profile;
wherein both the center point of the first circular arc and the center point of the second circular arc are located within a circle having a radius equal to the outer radius of the screw profile and having a center point corresponding to a point of rotation D;
wherein the center point of the first circular arc is located on a line segment, which starts at the point of rotation D and ends at the point that corresponds to the outer radius of the screw profile;
wherein the center point of the second circular arc is located on a line segment, which starts at the point of rotation D and ends at the point that corresponds to the inner radius of the screw profile.

2. The process as claimed in claim 1, wherein the center point of the first circular arc and the center point of the second circular arc are located within a circle having a radius equal to the outer radius of the screw profile and having a center point corresponding to the point of rotation D.

3. The process as claimed in claim 1, wherein both the center point of the first circular arc and the center point of the second circular arc are located within the screw profile.

4. The process as claimed in claim 1, wherein the profile curve in the sector comprises two circular arcs, wherein at a point PFP the circular arcs merge constantly differentiably into one another, wherein the point PFP lies on a straight line FP, the orthogonal line of which passes through the center points of the two circular arcs at the point PFP.

5. The process as claimed in claim 1, wherein the screw profile has a point PA, which lies on a circle about the point of rotation D with the outer radius ra of the screw element, a point PI, which lies on a circle about the point of rotation D with the internal radius ri of the screw element, a straight line DPA, which passes through the points PA and D, and a straight line DPI, which passes through the points PI and D, which, when using a Cartesian system of coordinates with the point of rotation D at the origin and the point PA on the x axis, wherein the orthogonal line intersects the straight line DPA at the center point of one of the circular arcs and the straight line DPI at the center point of the other circular arc, and in that the straight line FP is at a distance corresponding to half the centerline distance from the point of rotation D and has a gradient in radians of $-1/\tan(p/(2\cdot Z))$.

6. The process as claimed in claim 1, wherein screw profiles are dot-symmetrical in regard to the point of rotation D.

7. The process as claimed in claim 1, wherein screw profiles are axially symmetrical in regard to an axis which intersects both the point of rotation D and a point that corresponds to the outer radius of a screw profile.

8. The process as claimed in claim 1, wherein screw profiles are axially symmetrical in regard to an axis which intersects both the point of rotation D and a point that corresponds to the inner radius of a screw profile.

9. The process as claimed in claim 1, wherein screw profiles are axially symmetrical in regard to an axis which intersects both the point of rotation D and a point that corresponds to the inner radius of a screw profile and axially symmetrical in regard to an axis which intersects both the point of rotation D and a point that corresponds to the outer radius of a screw profile.

10. The process as claimed in claim 1, wherein the screw elements are constructed as mixing elements or conveying elements or kneading elements.

11. The process as claimed in claim 1, wherein the screw elements are used in a degassing or conveying zone.

12. The process as claimed in claim 1, wherein clearances in the range from 0.1 to 0.001 relative to the diameter of the screw profile are present between screw elements and barrel and/or between neighboring screw elements.

13. The process as claimed in claim 1, wherein the plastic compositions are thermoplastics or elastomers.

14. The process as claimed in claim 13, wherein the thermoplastics used are polycarbonate, polyamide, polyester, in particular polybutylene terephthalate and polyethylene terephthalate, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl)methacrylate, polyphenylene oxide, polyphenylene sulfide, polyether ketone, polyarylether ketone, styrene polymers, in particular polystyrene, styrene copolymers, in particular styrene-acrylonitrile copolymer, acrylonitrile-butadiene-styrene block copolymers, polyvinyl chloride or a blend of at least two of the stated thermoplastics.

15. The process as claimed in 13, wherein the thermoplastic is polycarbonate or a blend of polycarbonate with other polymers.

16. The process as claimed in 15, wherein the polycarbonate was produced by the phase boundary process or the melt transesterification process.

17. The process as claimed in 13, wherein the elastomer is styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta percha, acrylate rubber, fluororubber, silicone rubber, sulfide rubber, chlorosulfonyl-polyethylene rubber or a combination of at least two of the stated elastomers.

18. The process as claimed in claim 1, wherein fillers or reinforcing materials or polymer additives or organic or inorganic pigments, or mixtures thereof, are added to the plastic composition.

19. A process for extruding plastic compositions comprising:
I providing a multi-screw extruder with screw elements; and
II conveying, kneading, mixing, degassing or compounding the plastic compositions in the multi-screw extruder using the screw elements;
   wherein the screw elements of the extruder are co-rotated in pairs;
   wherein at least one pair of these screw elements is fully self-wiping in pairs, and each screw element of this at least one pair of screw elements comprises two, three or four screw flights Z, Z being the number of flights of the screw elements;
   wherein at least one screw element of this pair of screw elements being fully self-wiping in pairs and comprising two, three or four flights comprises a cross-section screw profile consisting of a constantly differentiable profile curve consisting of:
      nine, ten, eleven or twelve circular arcs in case of a screw element comprising exactly two flights;
      thirteen, fourteen, fifteen, sixteen, seventeen or eighteen circular arcs in case of a screw element comprising exactly three flights;
      seventeen, eighteen, nineteen, twenty, twenty one, twenty two, twenty three or twenty four circular arcs in case of a screw element comprising exactly four flights;
      the circular arcs merging tangentially into one another at their start and end points;
   wherein, in each sector of 360°/(2·Z), at least one screw profile, selected from a generating screw profile and a generated screw profile, comprises either two or three circular arcs;
   wherein, in at least one sector of 360°/(2·Z), at least one screw profile, selected from a generating screw profile and a generated screw profile, comprises a first circular arc, a second circular arc, and a third circular arc; wherein:
      a center point of the first circular arc is located on a line segment that extends from a center point of the second circular arc to a rightmost end point of the second circular arc;
      both the first circular arc and the second circular arc share a common line segment that extends from the center point of the first circular arc to the rightmost end point of the second circular arc and a leftmost end point of the first circular arc;
      a center point of the second circular arc is located on a line segment that extends from a center point of the third circular arc to a rightmost end point of the third circular arc;
      both the second circular arc and the third circular arc share a common line segment that extends from the center point of the second circular arc to the rightmost end point of the third circular arc and a leftmost end point of the second circular arc;
      a leftmost end point of the third circular arc is located at a point that corresponds to an inner radius of the screw profile; and
      a rightmost end point of the first circular arc is located at a point that corresponds to an outer radius of the screw profile;
      wherein the center point of the first circular arc is located on a line segment, which starts at the point of rotation D and ends at the point that corresponds to the outer radius of the screw profile;
      wherein the center point of the third circular arc is located on a line segment, which starts at the point of rotation D and ends at the point that corresponds to the inner radius of the screw profile.

20. The process as claimed in claim 19, wherein the center point of the first circular arc, the center point of the second circular arc, and the center point of the third circular arc are located within a circle having a radius equal to the outer radius of the screw profile and having a center point corresponding to the point of rotation D.

21. The process as claimed in claim 19, wherein the center points of the first circular arc and the center point of the second circular arc are located within the screw profile.

22. The process as claimed in claim 19, wherein the center points of the first circular arc, the center point of the second circular arc, and the center point of the third circular arc are located within the screw profile.

* * * * *